Jan. 15, 1957   B. H. WOODRUFF   2,777,699
AUTOMATIC RECORD PLAYER
Filed Aug. 20, 1949   13 Sheets-Sheet 1
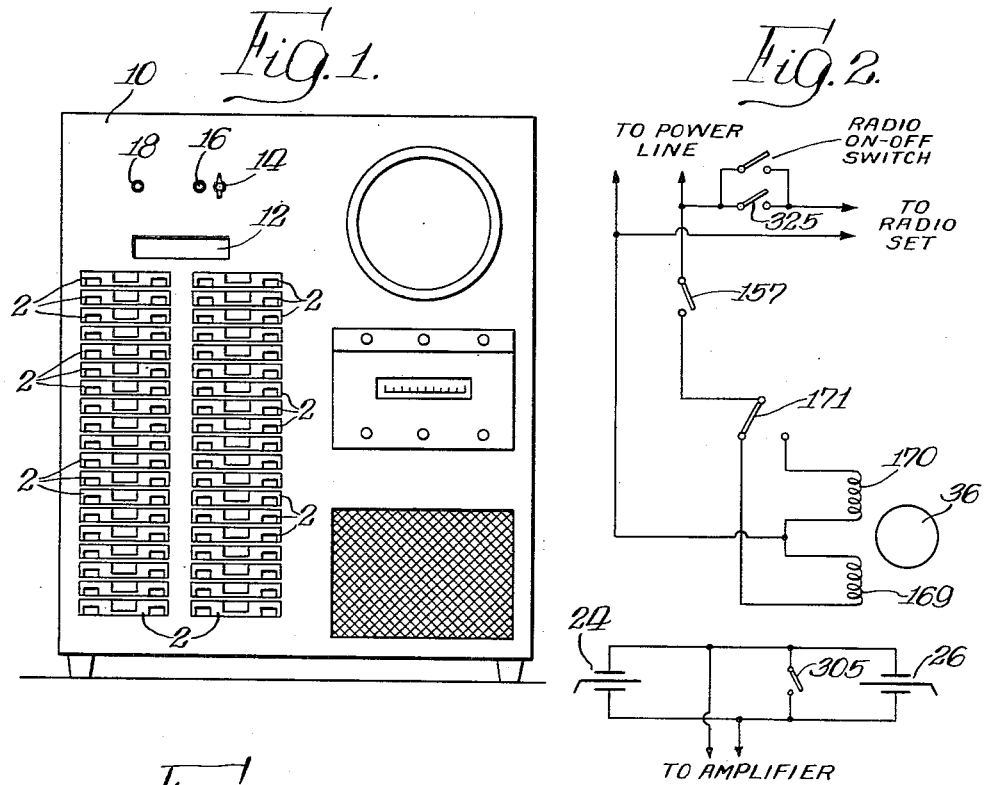
INVENTOR.
Ben H. Woodruff
BY
Foorman L. Mueller
Atty.

Jan. 15, 1957  B. H. WOODRUFF  2,777,699
AUTOMATIC RECORD PLAYER
Filed Aug. 20, 1949  13 Sheets-Sheet 2
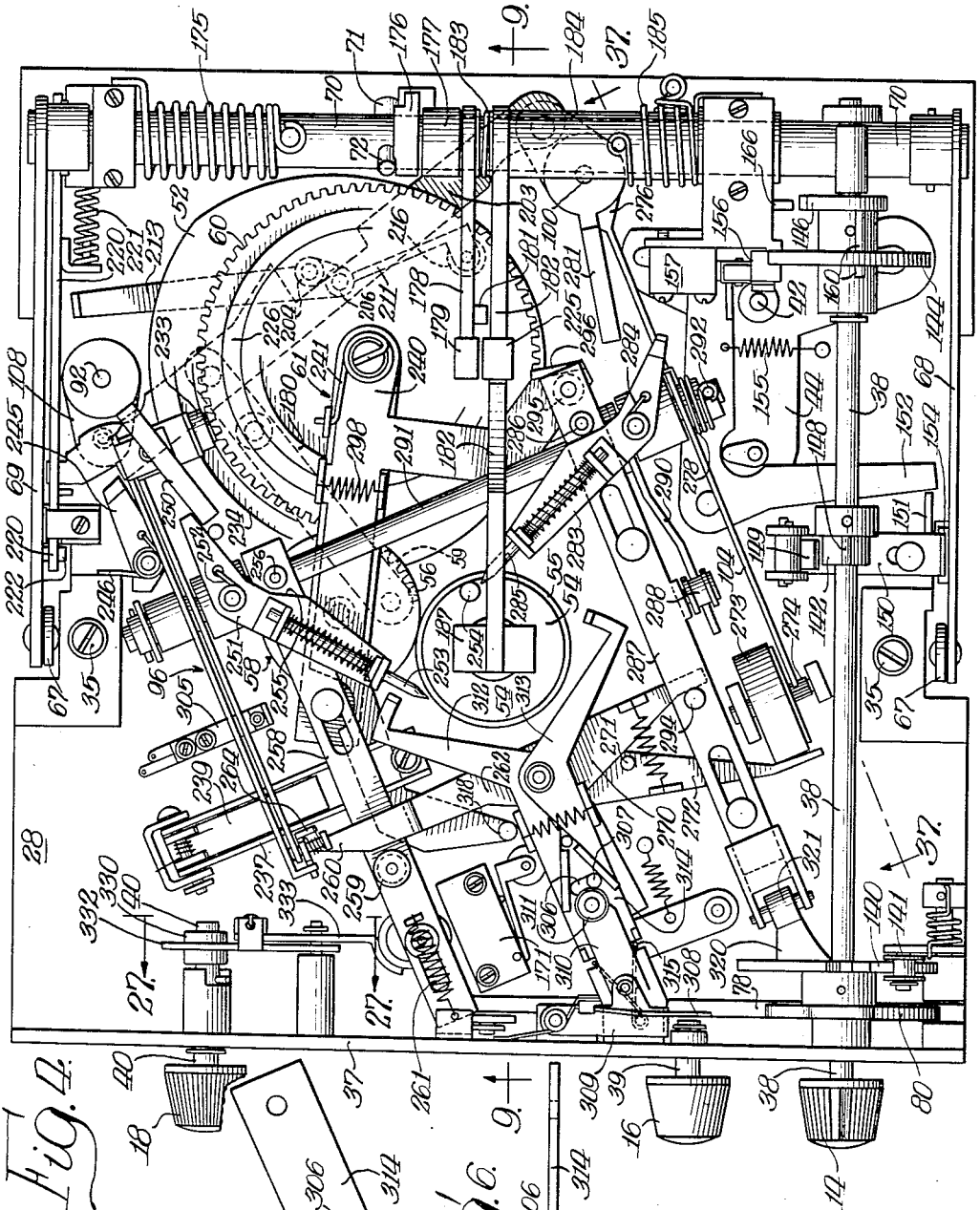
INVENTOR.
Ben H. Woodruff.
BY
Foorman L. Mueller
Atty.

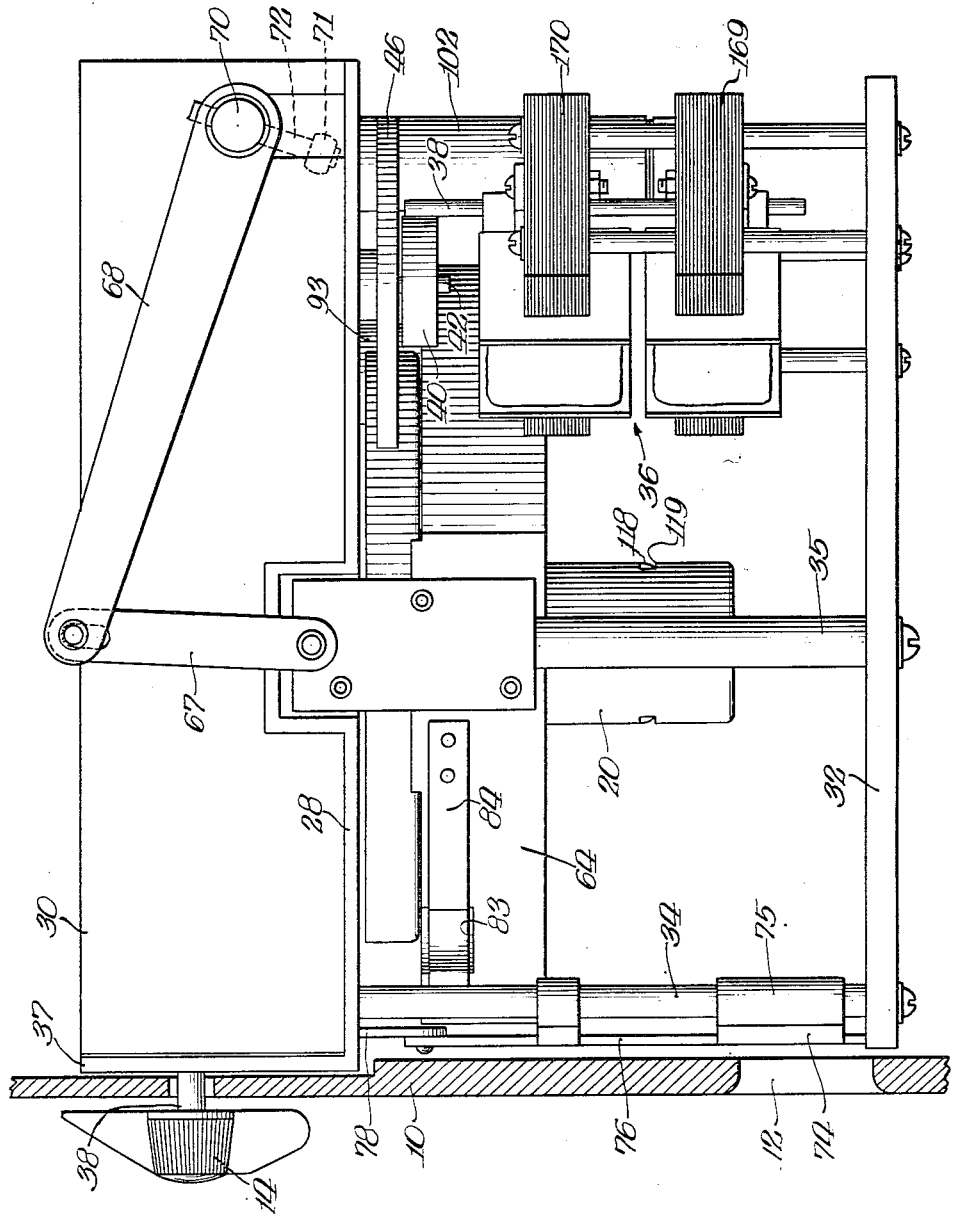

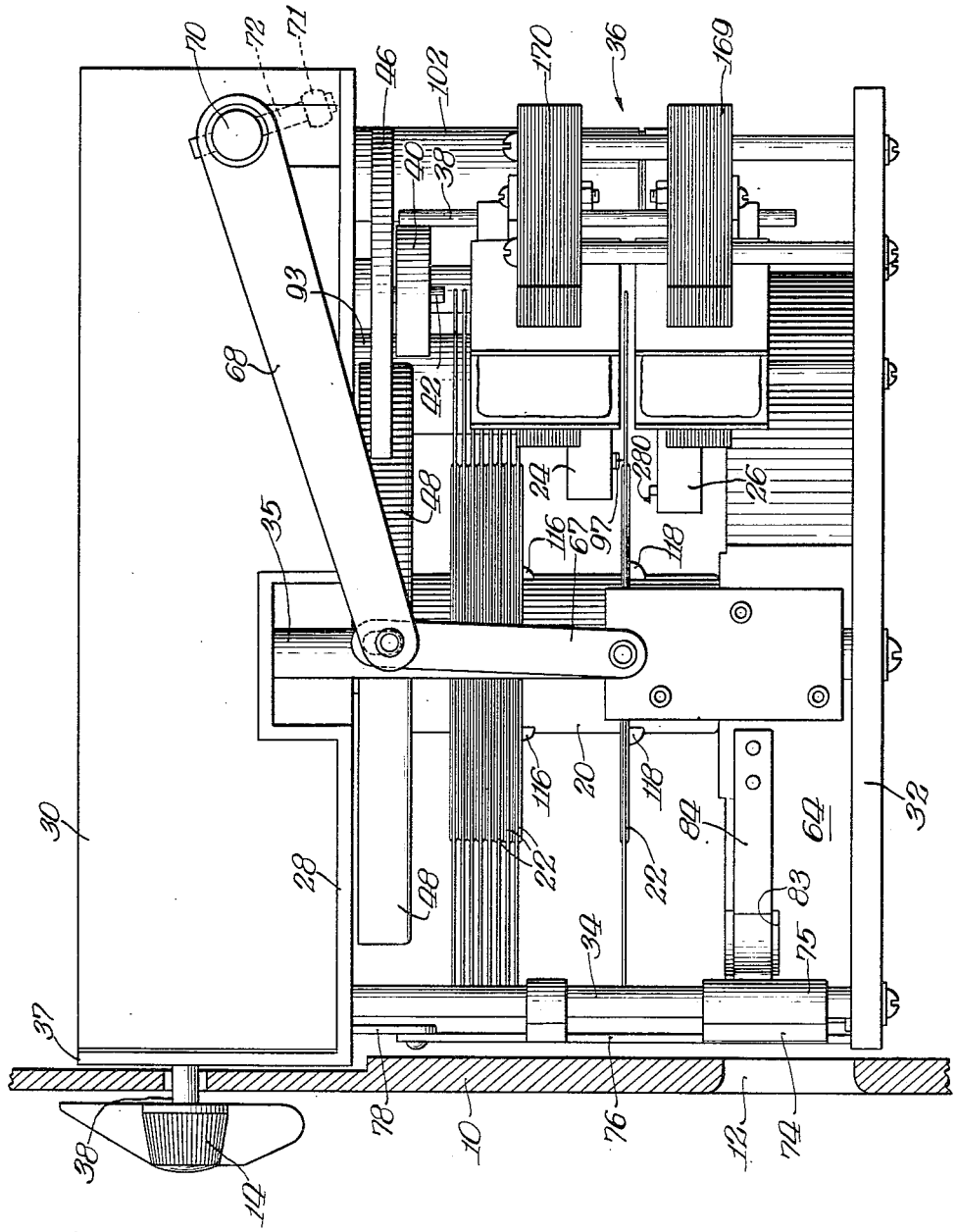

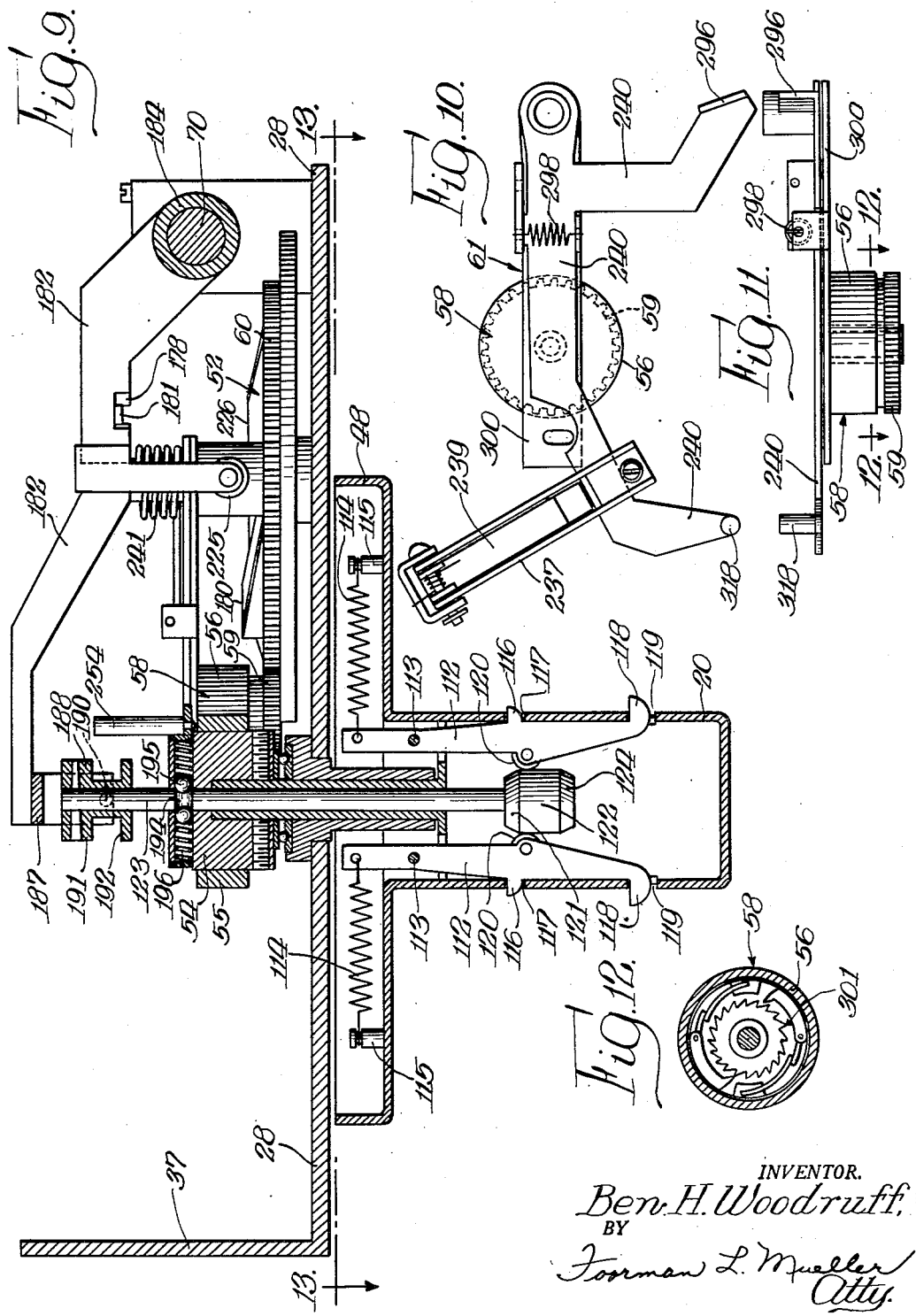

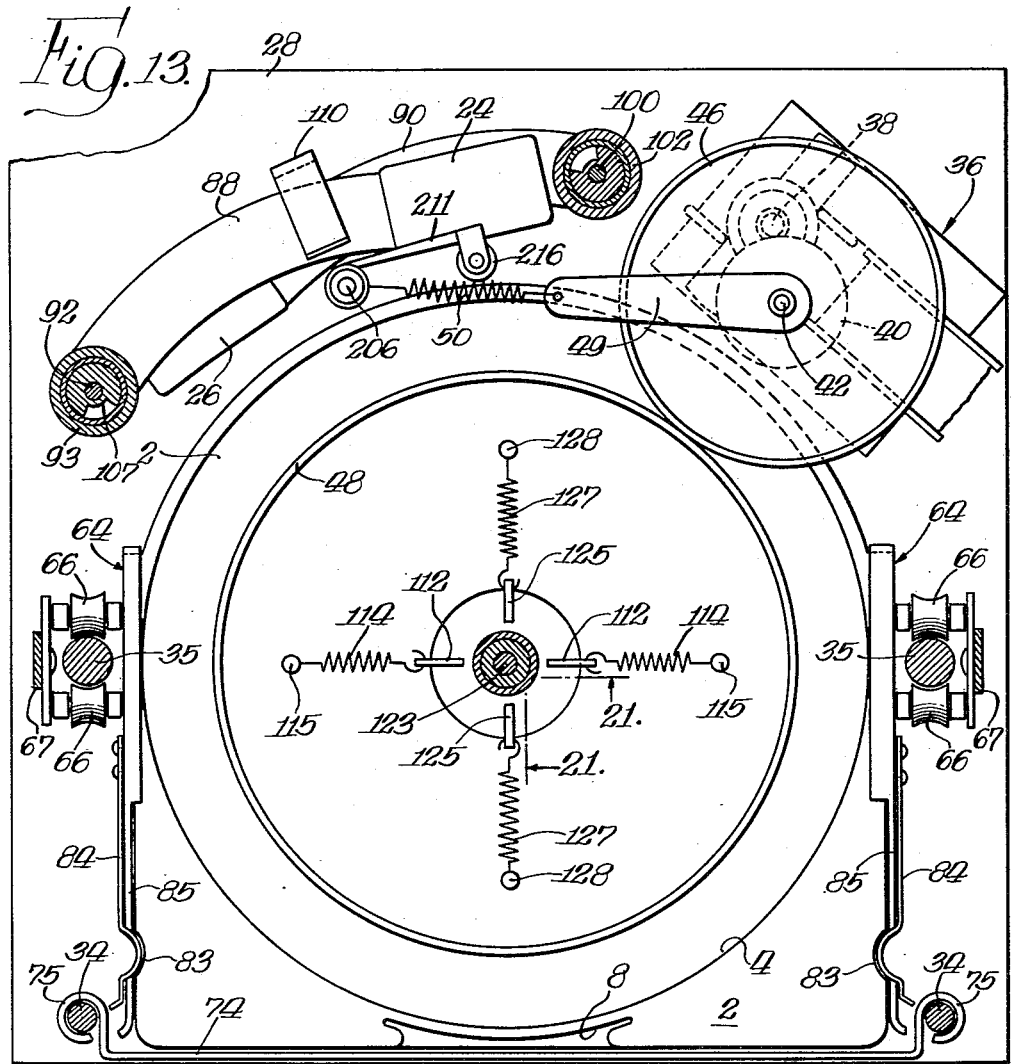
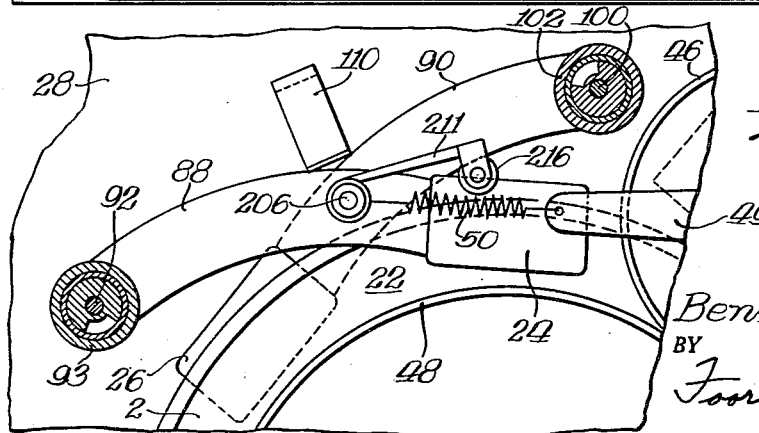

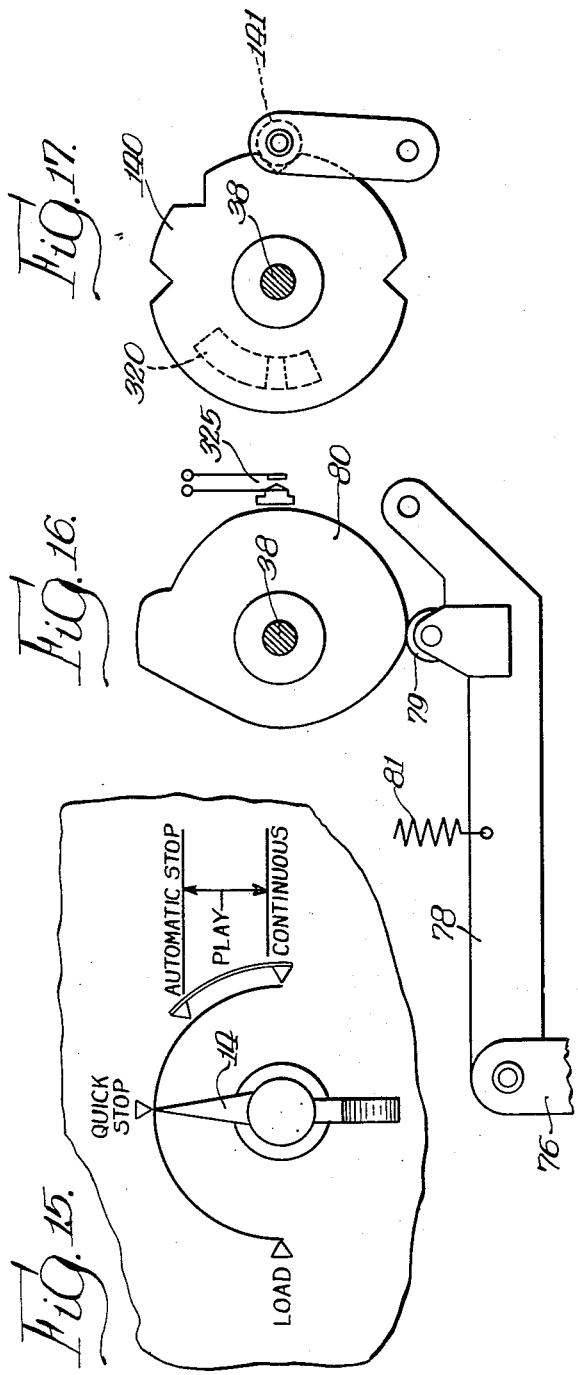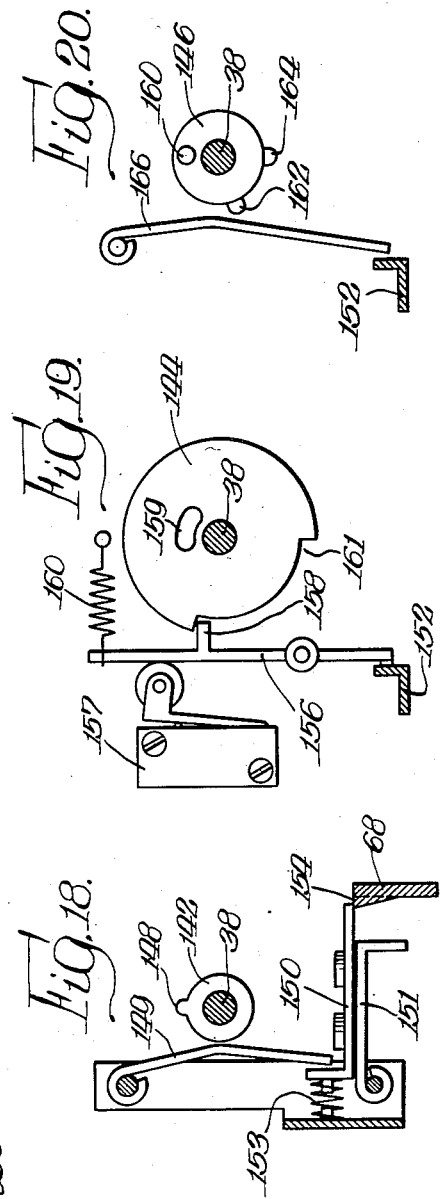

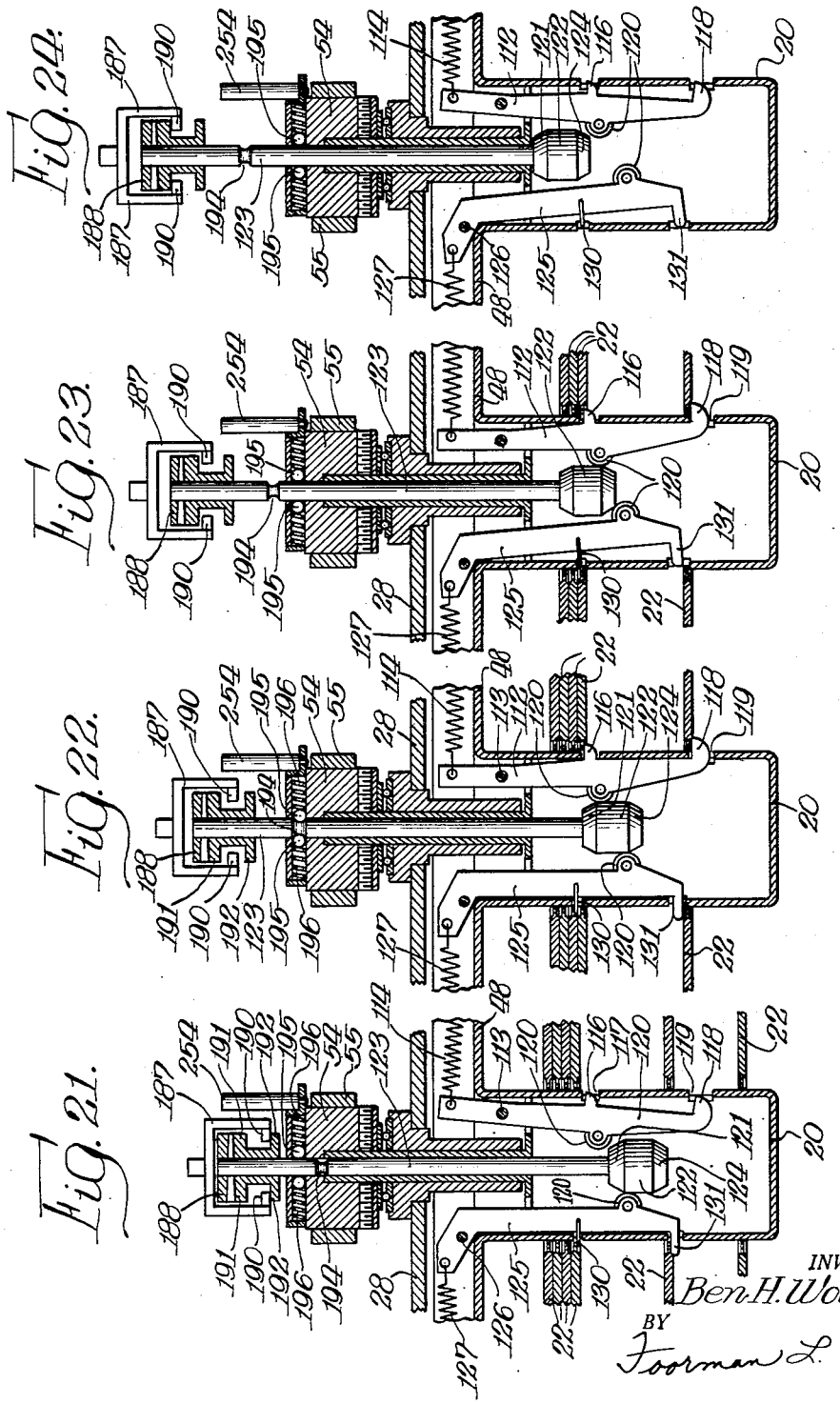

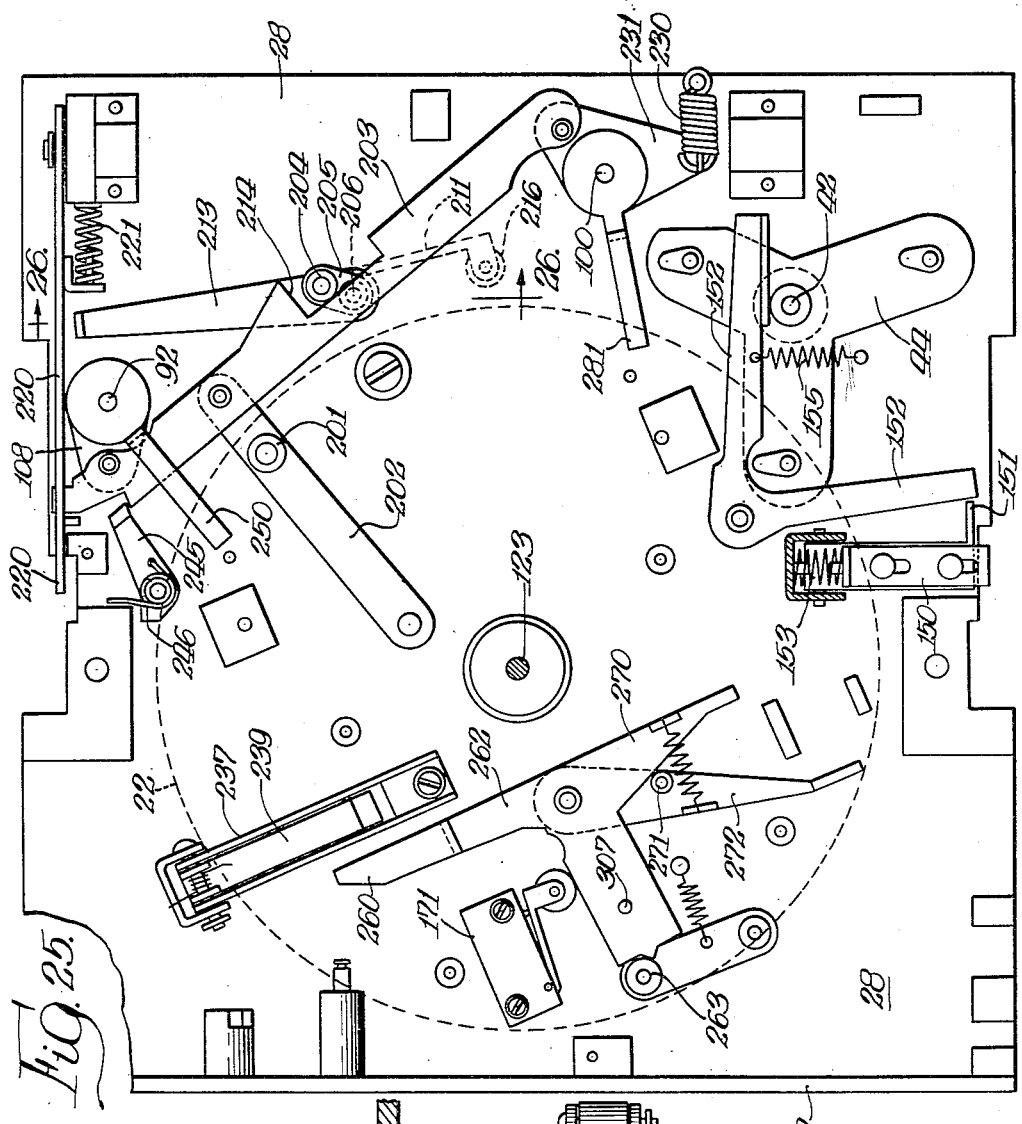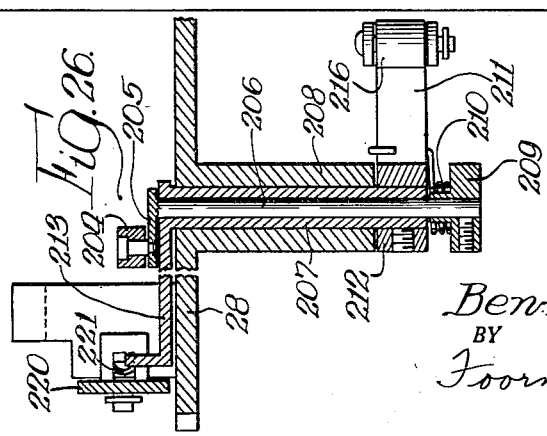

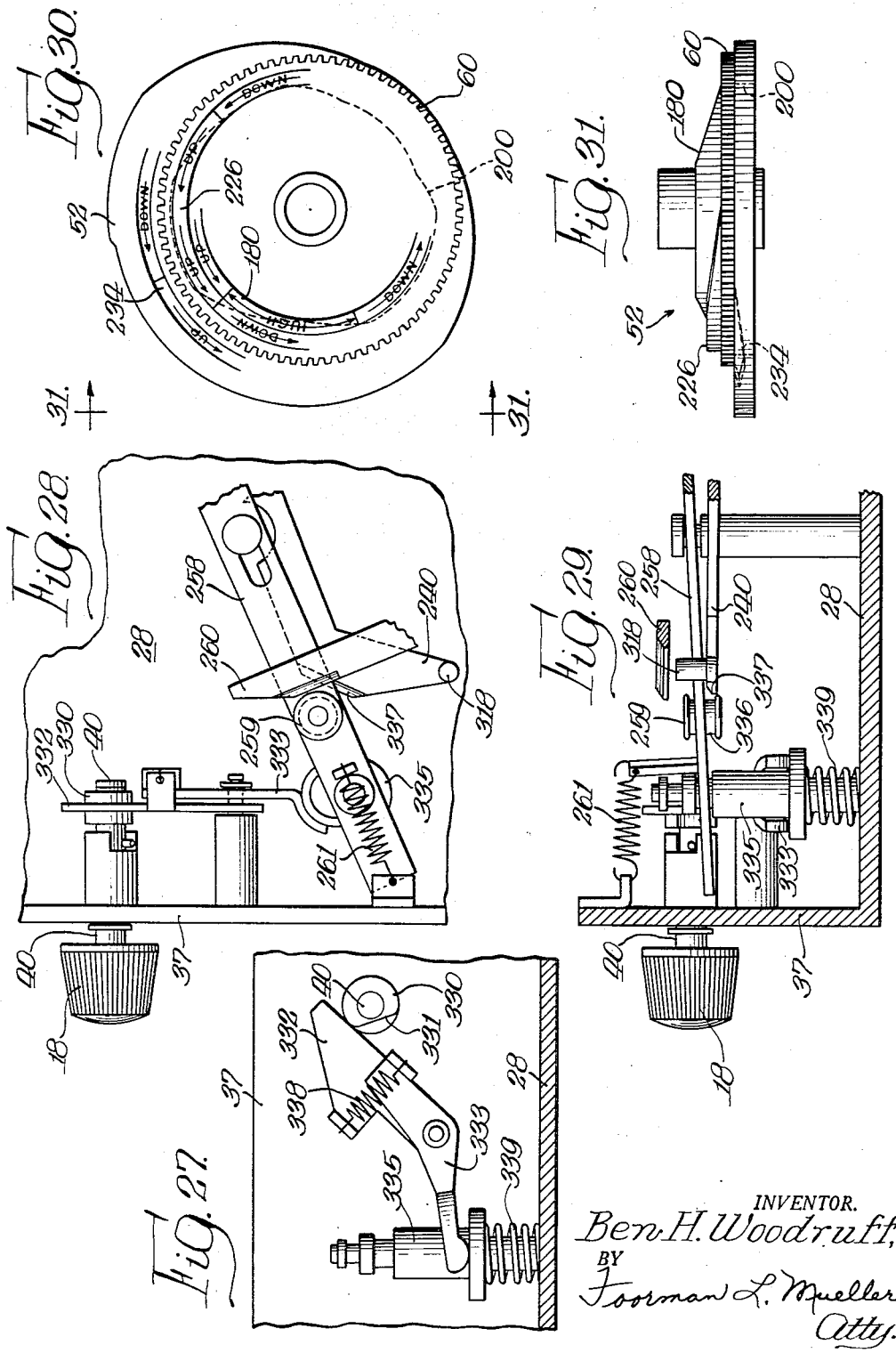

Jan. 15, 1957  B. H. WOODRUFF  2,777,699
AUTOMATIC RECORD PLAYER
Filed Aug. 20, 1949  13 Sheets-Sheet 11
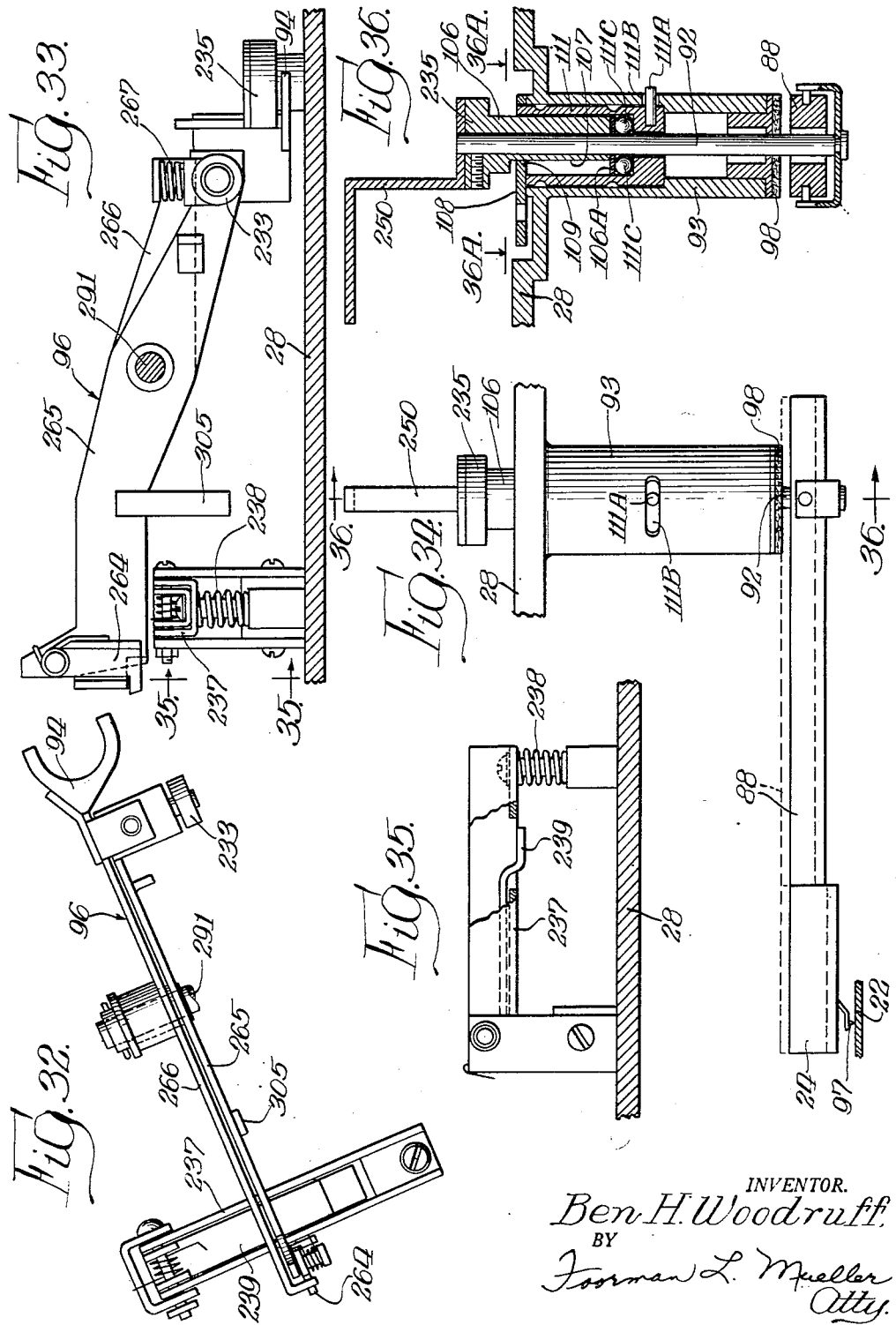
INVENTOR.
Ben H. Woodruff.
BY
Foorman L. Mueller
Atty.

Jan. 15, 1957  B. H. WOODRUFF  2,777,699
AUTOMATIC RECORD PLAYER
Filed Aug. 20, 1949  13 Sheets-Sheet 12
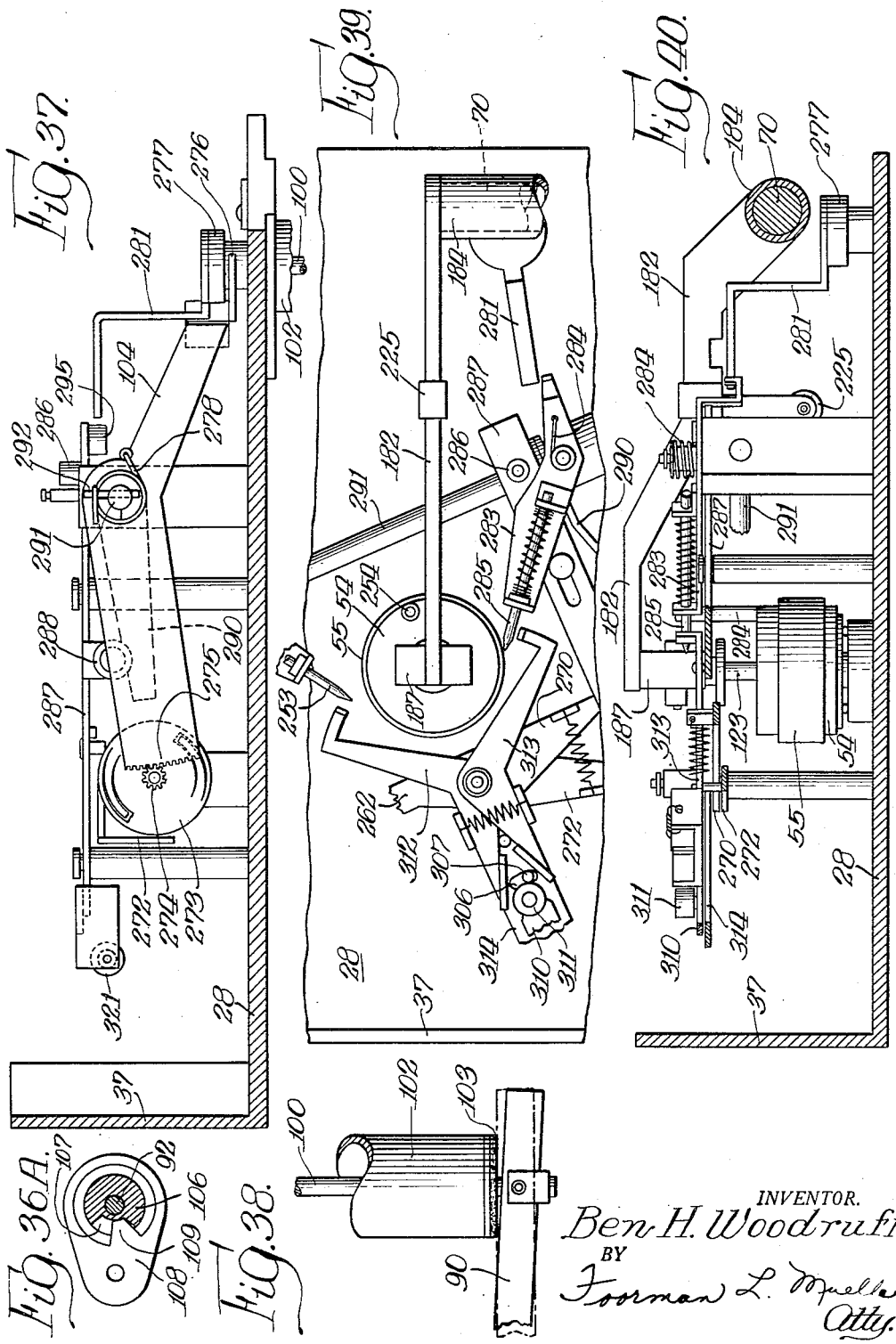
INVENTOR.
Ben H. Woodruff,
BY
Foorman L. Mueller
Atty.

Jan. 15, 1957   B. H. WOODRUFF   2,777,699
AUTOMATIC RECORD PLAYER
Filed Aug. 20, 1949   13 Sheets-Sheet 13

INVENTOR.
Ben H. Woodruff,
BY
Foorman L. Mueller
Atty.

United States Patent Office 2,777,699
Patented Jan. 15, 1957

2,777,699

AUTOMATIC RECORD PLAYER

Ben H. Woodruff, Chicago, Ill.

Application August 20, 1949, Serial No. 111,509

36 Claims. (Cl. 274—10)

This invention relates to automatic record players in general, and to two-sided automatic record players in particular.

One of the disadvantages of present-day record players is the problem of storing and handling large quantities of records. Records customarily must be transferred from albums or the like to the record player and back to the albums again, being handled repeatedly in the process. Such handling and exposure of the records subjects them to breakage, marring or other damage and causes them to accumulate a great deal of dust and other loose particles on their playing surfaces. The quality of the reproduction is likely to be impaired when the playing surfaces of the record are repeatedly contacted by fingers, exposed to dust in the air, slid across one another or otherwise subjected to abrasion. This is particularly detrimental in the case of modern slow-speed fine-grooved records, which require very sensitive pickup mechanisms that are readily affected by a scratch or a loose particle in the playing groove. Hence, there is a need for a record player that requires substantially no handling of individual records by the operator except to place a desired selection of records in a suitable receptacle which can be used both for storing the records and for loading the records bodily into the record player. There is also a need for a simple two-sided record player which can compete with single-sided automatic players now on the market. Prior two-sided record players have been extremely complicated and costly. Another disadvantage of record players, especially when they are incorporated in home radio sets or the like, is that they are susceptible to injury by careless or inexperienced persons who have access to the pickup mechanisms or other operative parts of the machine. Not infrequently serious damage is done by amateur servicemen who try to make changes or force the machine to operate in a different manner than was intended by the makers. Some effective measures to prevent rough handling or unauthorized tampering obviously are needed in such cases.

An object of the invention is to provide an improved automatic record player which is adapted to receive a tray or similar receptacle containing a stack of disc records, remove the records from the tray, play the records successively and return the records to the same tray from which they were taken in their original sequence.

Another object is to provide an improved automatic record player which eliminates the manual handling of individual records when loading and unloading the machine and when storing the records, or more specifically, which enables the records to be stored in portable trays that are bodily inserted into and bodily removed from the machine for loading and unloading the same.

Still another object is to provide a record playing machine for utilizing disc records without manual handling of the individual records when loading and unloading the machine.

Yet another object is to provide an improved two-sided automatic record player of considerably simpler design than prior two-sided players, the simplicity of design being made possible by certain novel features that are pointed out hereinafter.

A further object is to provide an improved automatic record player which is completely inaccessible to the operator except for a small opening into which a tray of records may be inserted, which opening is kept closed while the records are being handled by the machine, and an ancillary object is to prevent the machine from operating except when the aforesaid opening is closed.

A still further object is to provide an improved record player of the aforesaid character which cannot be switched off so long as any records are left on the spindle, and which turns itself off automatically when the last record is returned to the tray.

A still further object is to provide an automatic record playing machine in which a stack of records, or any unplayed portion of the stack, may be returned to the tray in quick succession without being played, if the operator decides not to play the entire stack.

A yet further object is to provide an improved record playing machine which can be adjusted at will to play a stack of records just once or to play the whole stack repeatedly if preferred.

An additional object is to provide an automatic two-sided record player of small size having lightweight parts and which is extremely easy to assemble and service.

A feature of the invention is the provision of novel record handling and record playing means in which a portable device holding a stack of disc records is insertable as a unit into an apparatus for playing the records and is thereafter removable as a unit from the apparatus carrying the same records arranged thereon in their original sequence.

Another feature is the mounting of substantially all mechanisms on top of the record player chassis, so that the machine may be assembled and serviced while standing upright in its normal position of use.

Another feature is the provision of a record player which is built into a cabinet so that it is inaccessible to the operator except for a small opening through which a tray of records may be inserted for playing. In this connection, there is provided a window for the opening which must be closed before the machine can start playing the records, and which prevents removal of the tray so long as records are being handled by the machine.

Still another feature is the provision of several unique controls including quick stop, automatic stop, continuous playing, playing of both sides only and playing of one side only.

Yet another feature is the provision of top-side and bottom-side pickups which are brought into engagement with the record in substantially the same way, that is, by lifting the pivot rods of their swinging arms, thereby simplifying the pickup mechanisms.

A further feature is the provision of safety controls which prevent the record player from being switched off while records are on the spindle, and which prevent the radio set from being turned off while the record player is set for continuous playing.

A still further feature is the provision of a tray loading mechanism by which a tray of records is lifted to place the record stack on a downwardly extending spindle located in vertical alignment therewith, the empty tray then being returned to a lower position to receive the records which are dropped from the spindle after being played.

Another feature is the provision of a record player in which the stack of records is stored in one position on the spindle while being played at another position on the spindle, with only one record at a time occupying the playing position on the spindle and being clamped firmly in such position so that there is no slippage of the record while it is being played.

A still further feature is the arrangement of the tray and spindle on a common axis, with all translatory movements of the records while in the machine being along this axis.

The foregoing and other objects and features of the invention will be better understood from the following detailed description thereof taken in connection with the accompanying drawings, wherein:

Fig. 1 is a front elevational view of a combination television (or radio) receiver and automatic record player, constructed according to the principles of the invention;

Fig. 2 is a circuit diagram of the record player;

Fig. 3 is a perspective view of a tray used for storing the records and loading the record player;

Fig. 4 is a plan view of the record player chassis;

Figs. 5 and 6 are plan and elevational views of certain details in the reject mechanism of the machine;

Fig. 7 is a side elevational view of the record changer, with the tray in raised position;

Fig. 8 is a side elevational view of the record changer after the emptied tray has been returned to its lower position and the bottom record of the stack has been dropped into playing position;

Fig. 9 is a vertical sectional view taken substantially on the line 9—9 in Fig. 4, omitting some of the parts for clarity;

Figs. 10 and 11 are plan and elevational views of an intermediate gear and link mechanism;

Fig. 12 is a cross-section on the line 12—12 of Fig. 11;

Fig. 13 is a cross-sectional view taken through the spindle mechanism of the machine, on the line 13—13 of Fig. 9, showing the tone arms in their rest positions;

Fig. 14 is a view similar to Fig. 13, but showing the upper and lower tone arms moved inwardly to their starting positions in conjunction with a record that is being played;

Figs. 15 to 20 are elevational views showing portions of the main control mechanism for the machine;

Figs. 21 to 24 are hybrid sectional views of the spindle mechanism (as viewed on the quarter-sectional line 21—21 in Fig. 13), illustrating various stages in the operation of the spindle mechanism during record changing and loading operations;

Fig. 25 is a partial plan view of the assembly shown in Fig. 4, with many of the parts omitted for clarity;

Fig. 26 is a sectional view of a record sensing means, taken on the line 26—26 in Fig. 25;

Fig. 27 is a vertical section on the line 27—27 in Fig. 4, showing a portion of the "Both Sides-Top Sides" control mechanism;

Figs. 28 and 29 are fragmentary plan and vertical sectional views further illustrating the mechanism associated with the "Both Sides-Top Sides" control;

Fig. 30 is a plan view of the control cam;

Fig. 31 is a side elevational view of the control cam as viewed from the line 31—31 in Fig. 30;

Figs. 32 and 33 are plan and elevational views of means for actuating the upper pickup mechanism;

Fig. 34 is an elevational view of the upper pickup mechanism;

Fig. 35 is a vertical section on the line 35—35 in Fig. 33;

Fig. 36 is a longitudinal section on the line 36—36 in Fig. 34;

Fig. 36A is a section on the line 36A—36A in Fig. 36;

Fig. 37 is a vertical section on the line 37—37 in Fig. 4, illustrating the principal parts of the means for actuating the lower pickup mechanism into and out of engagement with a record;

Fig. 38 is a fragmentary elevational view of the mounting for the lower tone arm;

Figs. 39 and 40 are fragmentary plan and elevational views of mechanisms involved in changing the sound pickup from one side of the record to the other, especially during a reject operation; and Fig. 41 is a timing diagram representing the sequential operations of the machine.

Figure 21:
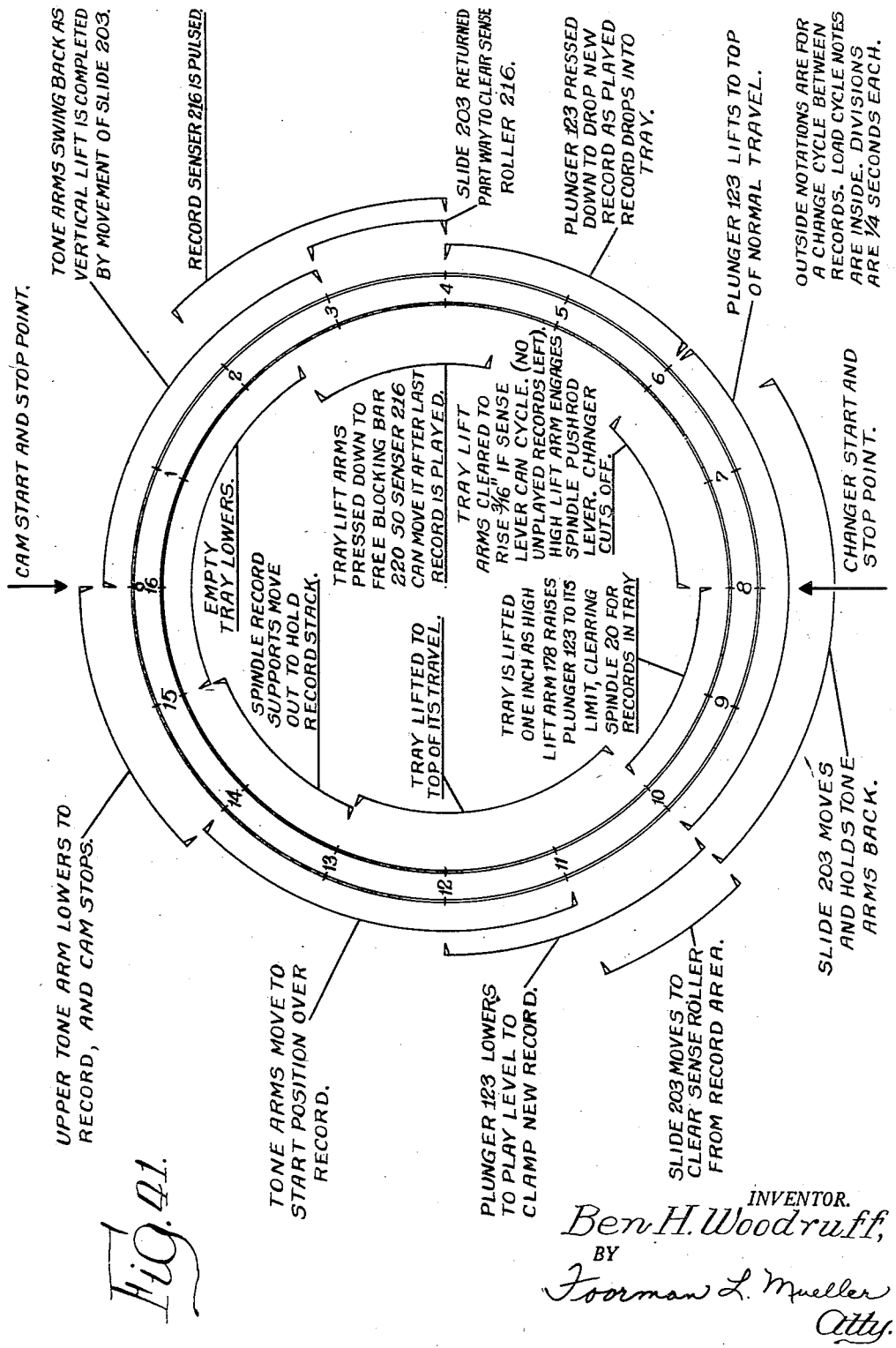

In practicing the invention, records are stored in trays instead of the usual albums. Once a desired selection of records has been placed in a tray, the records need not be touched again by human hands. Preferably the record player is built into a cabinet that houses a radio or television set, and it is wholly inaccessible to the operator except for a small opening through which a tray of records may be inserted into the record player. This opening normally is closed by a window that can be manually retracted only when the machine is in a condition to receive a tray of records. While the machine is handling records, this window is automatically locked and cannot be opened again until the last record in the stack has been returned to the tray. When the tray is inserted in the machine, and the record player is switched on, the tray is automatically unloaded, transferring the stack of records to a downwardly projecting spindle that is vertically aligned with the center of the tray. The records are held in an upper storage position. The records move one at a time from the bottom of the stack (in its storage position on the spindle) down to a playing position on the spindle. There is only one record at a time in such playing position. The record that is being played is clamped firmly from above and below and rotates with the spindle. The tray is positioned directly beneath the spindle, and as the playing of each record is finished, the record drops freely back onto the tray. The spindle and pickup mechanisms are designed for records with large center holes (1½ inches, for example). All movements of the records from storage to playing positions and back to the tray are controlled by a plunger rod within the spindle, which actuates supporting and separating devices mounted on the spindle.

Two tone arms are employed to play the top and bottom sides of the record, respectively. The tone arms move in unison between their rest positions and their starting positions. Each tone arm is individually engaged with the record by lowering a pivot rod on which the tone arm is mounted, and is retracted from the record by elevating the pivot rod. The machine can be set to play through a stack of records and then stop automatically, or it can play the same stack of records repeatedly. The record player cannot be switched off until the last record has left the spindle. To reject the unplayed portion of a stack of records on the spindle, it is necessary to set the machine for "Quick Stop" operation, which causes the records to pass successively from the spindle to the tray without being played. Each record changing cycle is about four seconds in length, and no control cam time is required for changing from top side to bottom side. A reject control is provided for rejecting either side of a record, that is, from the top side to the bottom side of the same record, or from the bottom side of one record to the top side of the next record. Also, the machine can be set to play both sides of each record or the top sides only. The machine is not required to idle if the bottom sides are not played.

GENERAL DESCRIPTION

In carrying out the purposes of this invention, it is contemplated that disc records will be stored in suitable receptacles such as the tray 2 shown in Fig. 3. This tray is provided with a circular rim 4 defining a cylindrical cavity into which a stack of records may be placed. The illustrated embodiment of the invention is adapted for use in conjunction with the new type records having large center holes, 1½ inches in diameter, for example. A desired selection of records is placed in the tray, and thereafter it is unnecessary to touch these records by hand except when it is desired to change the make-up of the stack. Each tray 2 has finger recesses 6 communicating with hollow spaces in the tray to facilitate removal of the tray from the machine, as will be explained later. There is also provided a recess 8 to receive a label bearing an appropriate legend relative to the records that are stored in the tray 2.

The record player preferably will be built into a radio or television cabinet such as 10, Fig. 1, which, in the more expensive installations, will have spaces in which a large number of the trays 2 may be kept. In less expensive installations, the machine may be provided with a plain panel or one having only a small number of tray-receiving recesses therein. When it is desired to load the records from a particular tray into the machine, the selected tray 2 is removed from its storage recess and is inserted through a rectangular opening 12 in the cabinet 10. The records, as mentioned above, are not handled by the operator in this process. The entire tray is inserted bodily into the opening 12, and the machine then automatically handles the records while they are being played and returns the records to the same tray from which they were taken.

The record playing machine is provided with certain controls, consisting of a main control, a reject control and a control for playing both sides or the top side only. The main control mechanism is actuated by a knob 14, Figs. 1 and 15, which has four positions respectively designated Load, Quick Stop, Play-Automatic Stop and Play-Continuous. The knob 14 is set to the load position when inserting or removing a tray. When it is desired that the machine play through a complete stack of records, return the records to the tray and then stop automatically, the knob 14 is set to the "play-automatic stop" position. If it is desired that the machine play the same stack of records repeatedly, the knob is set to the "play-continuous" position. When the operator desires to discontinue the playing of the records in a particular stack, he sets the knob 14 to the "quick-stop" position, which causes the records to be returned in quick succession to the tray 2 without being played, after which the machine shuts itself off automatically.

The reject button 16, Fig. 1, and the knob 18 for selecting "both sides" or "top sides only," control suitable mechanisms which are described in detail hereinafter. The functions of these mechanisms are obvious from their names.

As a tray 2 containing records is inserted into the record player through the opening 12, the stack of records therein is brought into axial alignment with a downwardly extending spindle 20, Figs. 7, 8 and 9. A window 74 then closes the opening 12, after which the tray 2 is elevated by the machine as shown in Fig. 7, being thereafter returned to a lower position as shown in Fig. 8, leaving the stack of records 22 in a storage position on the spindle 20. The records drop one at a time from this storage position to a playing position as indicated by the lowermost record 22 in Fig. 8, which is spaced from the stack of records 22 above it. Suitable pickups 24 and 26 carried by upper and lower tone arms 88 and 90 are brought successively into engagement with the top and bottom sides of the record 22 in playing position, assuming that both sides are to be played. If only the top side is to be played, the lower pickup is kept clear of the record. As each record 22 is played, it drops from the spindle 20 to the tray 2 therebelow, and its place is taken immediately by another record 22 which drops down from the stack, both of these records being dropped at the same time.

CHASSIS CONSTRUCTION

The chassis or top plate 28, Figs. 4, 7, 8 and 9, supports almost all of the mechanisms of the record player. A suitable cover or housing 30 is placed on top of the chassis 28. From the top plate 28 there is suspended a bottom plate 32 by means of a pair of vertical rods 34 and another pair of vertical rods 35. The lower plate 32 is substantially flat and carries no parts except a reversible motor 36. When the chassis 28 is mounted in the cabinet 10, the bottom plate 32 is approximately on a level with the bottom edge of the opening 12 in the cabinet 10 through which the trays 2 are inserted and withdrawn. The chassis 28 has an upstanding front wall 37 that is disposed adjacent to the inside surface of the front panel in the cabinet 10. Stub shafts 38, 39 and 40, to which the control knobs 14 and 18 and the reject button 16 are secured, project through apertures in this front panel from the front wall 37 of the chassis 28.

SPINDLE DRIVE

The reversible motor 36, Fig. 7, has a vertically extending shaft 38 (see also Fig. 13) which engages the tread of a friction wheel 40 rotatably mounted on a vertical pin 42. The pin 42 is secured to a floating plate 44, Fig. 25, that is slidably supported on the upper surface of the top plate or chassis 28. The pin 42 also carries a friction idler 46, Figs. 7 and 13, rotatable as a unit with the friction wheel 40, that is adapted to cooperate with the rim of a turntable 48 (so called because it resembles the turntable in a conventional record player). The turntable 48 is integral with the spindle 20 and is located at the top of this spindle. A link 49, Fig. 13, connects the pin 42 to a spring 50 that tends to urge the idler 46 into engagement with the turntable 48 and the friction wheel 40 into engagement with the motor shaft 38. When the record player is not in use, as will appear hereinafter, the friction wheels 40 and 46 are held out of engagement with the turntable 48 and the motor shaft 38, respectively.

It is to be noted that the term "turntable," as applied to the part 48, is not to be confused with the ordinary turntable on which records are placed to be played in conventional phonographs. The turntable 48, in effect, is merely a flange of large diameter that cooperates with the friction idler 46. Power is transmitted from the motor shaft 38 through the friction wheels 40 and 46 to the turntable 48, which rotates and turns the spindle 20 on which the records 22 are supported.

CONTROL CAM

The control cam 52, Figs. 4, 9, 30 and 31, is mounted in a horizontal position on the upper side of the chassis 28 and is rotatable about a vertical axis. This cam controls the loading and unloading cycles and the record changing cycles. The cam is driven by the rotating spindle assembly. As shown best in Fig. 9, the spindle assembly has a hub 54 thereon above the top plate 28, which hub is provided with a friction tread 55 that is adapted to cooperate with a hub 56 of an intermediate member 58. A gear 59 in the intermediate member 58 is adapted to mesh with a gear 60 on the control cam 52. The intermediate member 58 is mounted on a lever assembly 61, Figs. 4 and 10, which causes the intermediate member 58 to be brought into and out of engagement with the tread 55 on the hub 54 as circumstances require, thereby transmitting power or interrupting power to the control cam 52 as the case may be.

The control cam 52 is driven by the spindle assembly 20 only during the forward rotation of the motor 36. The shaft 38 of the motor is turning in such a direction at this time that the idler 46 tends to be forced against the turntable 48 by the frictional drag of the motor shaft 38 upon its idler 40, which is transmitted to the idler 46. This augments the force of the spring 50 acting upon the idlers and prevents slippage of the idlers under load. When the direction of motor rotation is reversed for bottom-side playing, the idler 40 has only a light load inasmuch as the control cam 52 is not coupled to the turntable 48 at this time, and the force of the spring 50 is adequate to prevent slippage.

TRAY HANDLING MECHANISM

When a tray 2, Fig. 3, is inserted through the opening 12, Figs. 1, 7 and 8, in the cabinet 10, it rests on a tray carrier generally designated 64 that is vertically reciprocable. The tray carrier 64 carries rollers 66, Fig. 13, that cooperate with the vertical support rods 35 to guide the tray carrier 64 in its up-and-down movement. The carrier 64 is connected by links 67 to lift arms 68 and 69 that are mounted on a rock shaft 70, Figs. 4, 7 and 8, journaled in bearings on the upper side of the chassis 28. A roller 71 on an arm or pin 72 extending from the shaft 70 follows the periphery of the control cam 52 during a loading and unloading operation of the machine. In Fig. 4 the roller 71 is disengaged from the cam 52 because the side arms 68 and 69 of the tray carrier 64 are held latched down under certain conditions of operation, as will appear hereinafter.

A vertically movable window 74, Figs. 7, 8 and 13, positioned adjacent to the inside surface of the cabinet 10, has formed ends 75 that respectively embrace the vertical support rods 34 to guide the window 74 in its up-and-down motion. The window 74 is connected by a link 76 to a lever 78, Fig. 16, carrying a follower 79 that cooperates with a cam 80 controlled by the main control knob 14, Figs. 1 and 15. When the knob 14 is in any position other than its load position, the cam 80 maintains the window 74 in its lower position where it blocks the opening 12 in the cabinet 10, thereby preventing insertion or removal of a tray. It is to be noted that the mechanical advantage of the lever 78 is very low so that there is no danger of injuring one's fingers by attempting to turn the knob 14 with one hand to close the window 74 while the fingers of the other hand are in the opening 12. When the knob 14 is moved to the load position, a spring 81 (Fig. 16) acting on the lever 78 raises the window 74 to its upper position in which it clears the opening 12.

Small arcuate recesses 83, Fig. 3, are formed in the sides of the tray 2, and when the tray 2 is placed in the tray carrier 64 a pair of spring members 84 and 85 on each side of the tray carrier 64 seats in the corresponding recess 83. This provides detents to prevent any forward sliding of the tray 2 while in the carrier 64, with rearward motion of the tray 2 being prevented by the configuration of the carrier 64. If the tray is not fully inserted into the carrier, the springs 84 and 85 do not seat in the recesses 83, and the outwardly turned ends of these springs prevent the window 74 from being closed. This in turn prevents the record player from operating, since the knob 14 cannot be turned into a playing position if the cam 80 is blocked by the roller 79.

PICKUP MECHANISMS

The upper and lower pickups 24 and 26, Fig. 8, are mounted on the ends of upper and lower tone arms 88 and 90, Figs. 13, 34 and 38. Considering first the upper tone arm 88, this tone arm is pivotally mounted on a rod or shaft 92 that is slidably and rotatably mounted within a hub or boss 93 that extends downwardly from the chassis 28. The rod 92 is positioned vertically by a lifting fork 94, Fig. 32, in a lever assembly 96 (see also Fig. 4). When the rod 92 is lowered, the tone arm 88 assumes the horizontal position indicated by full lines in Fig. 34. The pickup 24 moves downwardly until the pickup needle 97 contacts the top surface of the record 22 in playing position. On the other hand, if the rod 92 is elevated, the rear end of the tone arm 88 first strikes an edge of the pad 98, starting an upward swing of the pickup 24 to bring the needle 97 away from the record. As the rod 92 attains its uppermost position, the tone arm 88 is brought flush against the pad 98, causing the tone arm 88 to assume its limiting upper horizontal position, as shown by broken lines in Fig. 34. This simple up-and-down motion of the plunger 92 is all that is needed to produce engagement and disengagement between the pickup needle 97 and the upper side of the record 22.

A similar arrangement is provided in the case of the lower tone arm 90. Like the tone arm 88, the tone arm 90 is pivotally mounted on a vertically shiftable pivot rod 100, Fig. 38, supported within a boss 102 on the underside of the chassis 28. The tone arm 90 is suitably counterweighted so that it tends to bring its pickup against the underside of the record that is in playing position. If the rod 100 is in its lowermost position, such engagement of the bottom pickup with the record is made possible. To retract the bottom pickup from the record, the rod 100 is elevated, bringing the tone arm 90 against a felt pad 103 on the lower end of the boss 102. When the rod 100 is completely elevated, the tone arm 90 is flush with the pad 103 and is occupying a horizontal position, as indicated by broken lines in Fig. 38. Early in the course of such movement of the tone arm 90 between its limiting positions, the pickup needle is retracted from the record. The movement of the plunger 100 for the lower pickup mechanism is controlled by a lever 104, Figs. 4 and 37, as will be described more specifically hereinafter.

The means for producing horizontal swinging movements of the tone arms 88 and 90 will be described with reference to the upper tone arm 88 only, it being understood that similar provisions are made in the case of the lower tone arm 90. As shown in Figs. 36 and 36A, the rod 92 has a sleeve 106 with an arcuate cutout 107 therein, the sleeve 106 being secured to the rod 92. A flat horizontal lever 108 having a tooth 109 that is received in the cutout 107 is provided for positively moving the tone arm 88 from the rest position thereof illustrated in Fig. 13, to the start position as illustrated in Fig. 14 and back to the rest position in due course. Both of the tone arms 88 and 90 move in unison between these two positions under the control of a slide 203 (Fig. 25), and the tone arm which is to effect playing of the record is released by lowering its pivot rod as explained above.

While in their rest positions the tone arms 88 and 90 are supported by a bracket 110. There is a certain amount of free play between the tooth 109 and the cutout 107. As lever 108 swings, the tooth 109 picks up the sleeve 106, turning this sleeve and the shaft 92 to bring the tone arm 88 into the position shown in Fig. 14. The pickup 24 is then lowered onto the record 22. The limited amount of free play between the lever 108 and sleeve 106 enables the pickup 24 to travel across the record as the needle 97 follows the groove therein. This takes up substantially all of the lost motion. Hence as the pickup lever 108 moves back to its initial position, the tone arm 88 is swung through a large arc back into its rest position. On the other hand, the lower tone arm 90 having stayed in its starting position as shown in Fig. 14, is moved only a short distance because of the lost motion that still exists, thereby bringing the lower tone arm 90 back into its rest position with the tone arm 88. The pads 98 and 103 provide sufficient friction to keep the tone arms 88 and 90 from drifting when held against these pads, without retarding the positive actuation of these tone arms in the manner later explained.

As shown best in Fig. 36, the interconnected pivot rod and sleeve 106 of the upper pickup mechanism are received within a sleeve 111 that is rotatable with respect to the boss 93 through a limited distance. The sleeve 111 is not connected to the rod 92, and a series of balls 111C is disposed in a raceway which is defined by a portion of the sleeve 111 beneath the balls 111C and by an annular disc or washer 106A which is interposed between the sleeve 106 and the balls 111C. When the pivot rod 92 is in its lowermost position (during the playing of a record side) the sleeve 106 bears down upon the washer 106A supported by the balls 111C. The balls 111C also serve to guide the rod 92 when it is being elevated and lowered. The sleeve 111 is prevented from moving vertically by a pin 111A attached thereto, which pin extends through an arcuate horizontal slot 111B, Figs. 34 and 36, in the boss 93. A similar construction is employed in the case of the lower pickup mechanism.

SPINDLE ASSEMBLY

Details of the spindle assembly are shown best in Figs. 9 and 21 to 24. A pair of supports 112 is mounted within the spindle 20. Each of the supports 112 is, in effect, a short lever pivoted at 113. The upper end of each support lever 112 is connected to a spring 114 that is anchored at 115, Figs. 9 and 13, to the turntable 48. Each of the supports 112 has an upper dog or lug 116 that projects through an opening 117 and a lower dog or lug 118 that projects through an opening 119 in the spindle 20. Each lever 112 also has a roller 120 journaled thereon that is adapted to follow a cam 122 at the lower end of a vertically reciprocable rod or plunger 123, Fig. 9. As the rod 123 is moved up and down, in the manner explained subsequently, the roller 120 slides successively on the cylindrical center portion of the cam 122 and the tapered or pivotal end portions 121 and 124 thereon. This causes the dogs 116 and 118 to be intermittently retracted and restored, with the results about to be described.

Also mounted within the spindle 20 is a pair of separators 125, of which only one is shown in each of Figs. 21 to 24. These four views are not true cross-sections, since they represent each separator 125 as being diametrically opposite a support 112. This is done for convenience in describing the operation of the spindle assembly. Actually the two supports 112 are diametrically opposite each other, as shown in Fig. 9, and the two separators 125 are diametrically opposite each other as indicated in Fig. 13. Each separator 125 is pivoted at 126 and is biased by a spring 127 anchored at 128 on the turntable 48.

Each separator 125 has a blade 130 mounted therein which is adapted to be inserted between the bottom record and the adjoining record of the stack as shown best in Fig. 22. The separators 125 also have lugs 131 at their lower ends which serve both as temporary stops for a record 22 that is dropped from the stack toward playing position, Fig. 21, and as clamping members for holding the upper side of the record while the underside of the record is engaged by the dog 118 when the record is in playing position, Fig. 22.

Each of the records 22 has a thick annular portion on which the label is placed, and a thin inner rim adjoining this thick portion. The blades 130 therefore are easily inserted between the records because of the spaces between the thin inner rims thereof. The upper dogs 116 extend only as far as the thin inner rim of the bottom record of the stack. The lower dog 118, because of its greater arc of swing, extends slightly past the thin inner rim and engages the thicker edge portion of the record.

When records are being loaded onto a spindle 20, the plunger 123 is elevated to its extreme upper position shown in Fig. 24. This causes the supports 112 and the separators 125 to be completely retracted within the spindle 20, leaving a smooth outer surface for the records to slide over on their way up to the storage position. Then, as the tray reaches its uppermost position, the plunger 123 is moved into the neutral position thereof shown in Figs. 9 and 22, causing the dogs 116 to emerge from the spindle to hold the stack of records in storage position. The tray 2, Fig. 3, has a center hole 135 which is substantially larger than the spindle 20 so that the tray may move freely relative to the spindle without encountering any obstruction from the dogs 118 and the lugs 131.

To change a record or to move the first record into its playing position, as the case may be, the plunger 123 first is moved from its neutral position in Fig. 22 down to its lower position in Fig. 21. This releases the bottom record in the stack, which thereupon drops down toward the playing position. The blades 130 prevent the remaining records in the stack from dropping. The lugs 131 momentarily stop the released record in its downward travel before it arrives in the playing position. Meanwhile, if a record was previously in the playing position, such record drops down, as indicated in Fig. 21, falling from the end of the spindle 20 back into the tray 2 therebelow. The rod 123 then is moved to its neutral position, Fig. 22. The next step is to move the rod 123 into an upper position intermediate the neutral position and the extreme upper position thereof, as shown in Fig. 23. This causes the record which is resting on top of the lugs 131 to drop a slight amount as the lugs 131 are retracted, coming to rest on the dogs 118. The rod 123 then is moved back into the position shown in Fig. 22, bringing the lugs 131 back onto the upper side of the record. Thus, the record is held at two points below by the dogs 118 and at two points above, displaced 90° therefrom, by the lugs 131. This serves to clamp the record firmly in playing position.

MAIN CONTROL CAMS

The main control knob 14, Figs. 1, 4 and 15, operates a shaft 38 on which are mounted various control cams 80, 140, 142, 144 and 146, best shown in Figs. 16 to 20. The function of the cam 80 has been described hereinabove with respect to the raising and lowering of the window 74 in back of the loading slot 12. The cam 140 serves in most instances as a detent, and during a "quick stop" operation it forces continuous rotation of the control cam 52 until all the records are back in the tray. The cam 140 has a notched periphery that cooperates with a spring-biased roller 141 to effect the necessary detent action for correctly positioning the control shaft 38. The cams 142, 144 and 146 have various functions that differ with the different types of operations that are being performed, as will be explained in greater detail subsequently. The cam 142 has a point 148 thereon that is adapted to cooperated with a bent lever or cam follower 149, the lower end of which cooperates with a horizontal slide 150, shown also in Figs. 4 and 25. The slide 150 has a pin-and-slot connection with a lever 151 that cooperates with one end of an angle lever 152, Figs. 4, 19 and 25. Normally, when the slide 150 is urged to its extreme forward position by the spring 153, the front end of the slide 150 is disposed in the vertical path of movement of a projection 154 on the tray carrier lift arm 68. As a matter of fact, the slide 150 may rest upon the projection 154. When the slide 150 is retracted by the cam 142, however, it is clear of the projection 154, and the lever 151 is free to drop for a limited distance.

The lever 152 is biased by a spring 155, Fig. 25, and it tends to move the idler plate 44, Fig. 25, in opposition to the spring 50 which pulls the idler 46 toward the turntable 48. The spring 155 is more powerful so that if the lever 152 is unrestrained, it pulls the idler wheels 40 and 46 away from the motor shaft 38 and the turntable 48, whereby preventing the formation of flats on those wheels when the machine is not operating. Suitable braking means (not shown) may be applied to prevent movement of the turntable 48 and control cam 52 after the machine cuts itself off.

The lever 152 also acts against a lever 156, Figs. 4 and 19, that operates an on-off switch 157 for the record player. When the lever 152 is free to move under the influence of its spring 155, the lever 156 is pushed counterclockwise away from the position thereof shown in Fig. 19, thereby opening the switch 157. The lever 156 has a lug 158 that is adapted to cooperate with the cam 144. The cam 144 is not secured to the control shaft 38 but has an arcuate slot 159 therein which receives a pin 160, Fig. 20, in the cam 146 that is fast on the shaft 38. Under certain circumstances, the lever 152 is tilted against the action of its spring 155 and is blocked by the lever 151 while the latter is in its lower position. This releases the lever 156 to the action of its spring 160. The cam 144 has an extended arcuate recess 161 in its periphery, and for certain settings of the main control knob 14, Fig. 15, the lug 153 is free to enter the recess 161, allowing the main power switch 157 to close. The positions of the various control cams shown in Figs. 16 to 20 are those which they occupy when the control knob 14 has been returned to its "quick stop" position after having been set previously in either the "play-automatic stop" or "play-continuous" position.

The cam 146, Fig. 20, has two points 162 and 164 thereon which cooperate with a bent lever or cam follower 166. The lower end of the lever 166 cooperates with a portion of the L-shaped lever 152, Figs. 4, 20 and 25. This will be explained hereinafter.

OPERATION

Play-automatic stop, both sides

This operation will be described first, since it is the usual manner in which the record player is employed. The control knob 18, Fig. 1, is set for playing both sides of the record. The main control knob 14 is moved to the "load" position (extreme left, Fig. 15). A tray of records is inserted through the opening 12, and the main control knob 14 then is rotated to the position designated "play-automatic stop." When the knob 14 was turned to the "load" position, the cam 142, Fig. 18, retracted the slide 150, allowing the lever 15 to drop and rest upon the lever 152. Then, as the knob 14 was turned to the "play-automatic stop" position, the point 162 on the cam 46, Fig. 20, momentarily actuated the lever 166 to push the lever 152 and swing it counter-clockwise as viewed in Fig. 25. This caused the lever 151 to drop below the edge of the lever 152, thereby blocking the return of the lever 152. Slide 150 meanwhile is positioned below the normal position of the projection 154 so that the lever 151 is not disturbed when the tray carrier arm 68 subsequently rises in the loading step of the operation. Because of the lost-motion connection of the cam 144, the lug 153 does not enter the recess 161, Fig. 19, until the control knob 14 reaches the "play-automatic stop" position. The lever 156 thereupon swings inwardly and permits the power switch 157 to close.

Referring now to the circuit diagram, Fig. 2, the driving motor 36 has two windings 169 and 170 which are energized alternatively to operate the motor 36 in the forward and reverse directions, respectively. The forward rotation of the motor is utilized for playing the top side of the record, for operating the control cam 52, and for actuating the tray elevating and lowering mechanism. A reversing switch 171, Figs. 2 and 25, normally is so positioned that the forward winding 169 is energized when the main power switch 157 is closed.

In describing the operation of the machine from this point on, frequent reference will be made to the timing chart in Fig. 41. The circle with the numbers 1 to 16 marked on the periphery thereof represents the total elapsed time for a cycle of the control cam 52, Figs. 4, 30 and 31. One complete rotation of the cam 52 takes place during each record changing operation. The complete cycle is of four seconds duration, and the interval between any two successive numbers in the series 1, 2, 3 and so on, is one-quarter second. The record loading operation will first be described with reference to this timing chart.

As the motor 36 starts to rotate (chart point 8, Fig. 41), it drives the control cam 52, Figs. 4, 30 and 31, through the medium of the above-described friction couplings. Movement of the control cam 52 from point 8 to point 10 on the chart permits roller 71 (which is engaged with the periphery of the cam 52 at this time) to swing inwardly as the cam 52 presents a relieved portion of its periphery to this roller. The roller 71, as described above, is journaled on an arm or pin 72 secured radially to the shaft 70. The shaft 70 is loaded by a spring 175, and as the roller 71 swings inwardly, this spring 175 acts upon the shaft 70 to turn the lift arms 68 and 69, which are connected to the tray carrier by the lift links 67. This causes the tray of records to be lifted for a vertical distance of about one inch.

The pin 72 on which the roller 71 is joined has camming engagement with a collar 176 that is slidably but non-rotatably mounted on the shaft 70. The collar 176, when arm 72 rotates, bears axially against the hub 177 of a high lift arm 178 having a cam follower 179 that cooperates with a track 180, Figs. 30 and 31, on the upper face of the cam 52. As the arm 178 is cammed axially by the pin 72 on the shaft 70, a lug or projection 181 on the arm 178 moves beneath a low lift arm 182 which is rotatably mounted on the shaft 70. Normally the arms 178 and 182 are urged apart by a compression spring 183 which is inserted between them on the shaft 70. The hub 184, Fig. 4, of the low lift arm 182 is journaled on the shaft 70 and is acted upon by a loading spring 185, which tends to urge the arm 182 downwardly.

The lift arm 182 terminates at its outer end in a yoke 187 (Figs. 4, 9 and 21) that embraces a collar 188 pinned to the outer end of the plunger 123 in the spindle assembly 20. The yoke 187 has inward projections 190 that are received in an annular space defined by a reduced portion of the collar 188 between an upper annular shoulder 191 and a lower annular shoulder 192 on the collar 188. The neutral positions of the yoke 187, collar 188 and plunger 123 are illustrated in Fig. 22. The plunger 123 has an annular groove 194 therein. Balls 195 mounted in the hub 54 are urged by coil springs 196 radially against the periphery of the plunger 123. When the balls 195 are seated in the groove 194, as shown in Fig. 22, and the yoke 187 is in its rest or neutral position, the projections 190 on the yoke 187 are spaced from both of the shoulders 191 and 192. This provides a detent for holding the plunger 123 in such position that this plunger may rotate with the spindle 20 without being subjected to any frictional drag by the yoke 187.

When the high lift arm 178 is coupled to the low lift arm 182, as mentioned above, the lift arm 182 is raised to its maximum upward position (between chart points 8 and 10, Fig. 41), causing the yoke 187 to elevate the plunger 123 to its extreme upper position as shown in Fig. 24. This moves the cam 122 at the lower end of the plunger 123 entirely clear of the rollers 120 on both the supports 112 and the separators 125. The springs 114 and 127 are therefore effective to retract the dogs 116 and 118, the blade 130 and the lug 131 within the spindle 20, leaving the cylindrical outer periphery of the spindle 20 unobstructed.

Between chart points 10 and 13 the control cam 52 rotates and allows the roller 71 (Figs. 4, 7 and 8) acting on the periphery of this cam, to swing inwardly a maximum amount. The spring 175 acting on the shaft 70 is powerful enough to elevate the tray carrier 64 to its extreme upper position as shown in Fig. 7, carrying with it the tray 2 (Fig. 3) loaded with a stack of disc records 22 (shown in Fig. 8).

While the tray carrier is in its uppermost position (between chart points 13 and 15), the high lift arm 178 is lowered by the cam track 180, causing the push rod or plunger 123 in the spindle assembly to move from the position thereof shown in Fig. 24 into the position thereof shown in Fig. 23. This moves the cam 122 downwardly a small amount and causes the dogs 116 and 118 to be projected through the spindle 20. Between the chart points 15 and 2.5, the control cam 52 pushes roller 71 outwardly again, causing the tray carrier 64 to be lowered into its normal position as shown in Fig. 8, leaving the stack of disc records 22, supported by the dogs 116 on the spindle 20. From chart point 2.5 to point 4.5 the roller 71 is given an additional outward swing by the periphery of cam 52, causing the shaft 70 to move through a small additional arc, which presses the side arms 68 and 69 down a short distance further. The links 67 have elongated slots at their upper ends which permit the side arms 68 and 69 a slight amount of lost motion.

In this same chart interval, between points 2.5 and 4.5, while the side arms 68 and 69 are pressed downwardly to their limit, the cam 52, by means of a cam track 200 on the under side thereof (Fig. 30), moves a roller 201 on a pivoted arm 202, (Fig. 25). The arm 202 is pivotally connected to a slide 203 disposed on the upper side of the top plate 28. The slide 203 is notched to receive a roller 204 (Figs. 25 and 26) carried by a crank arm 205 on a shaft 206 that is journaled within a sleeve 207 in a hub 208 on the under side of the chassis 28. A collar 209 secured to the other end of the shaft 206 is connected by a spring 210 to an arm 211 having a hub 212 that is secured to the sleeve 207. The sleeve 207 terminates, on the upper side of the chassis 28, in a laterally extending arm 213 that is adapted to swing through a limited distance. As the slide 203 is shifted in the manner just described, a shoulder 214 on the slide 203 engages the roller 204 and turns the crank arm 205. Through the spring 210 (Fig. 26), this force is transmitted to the arm 213, causing this arm to swing to the right as viewed in Fig. 25. Movement of the arm 213 is limited by a sensing roller 216 on the arm 211, which roller is positioned in alignment with the lowermost record in a stack of records 22 stored on the spindle 20 above the dogs 116. If the sensing roller 216 contacts a record in the storage space, the arm 213 is prevented from moving any further distance, and consequently the actuation of slide 203 merely stresses the connecting spring 210, Fig. 26.

A sliding bar 220 (Figs. 4, 25 and 26) is loaded by a spring 221 which tends to urge the bar 220 toward the front of the changer, that is, to the left as viewed in Figs. 4 and 25. If the arm 213 is held by the sensing roller 216 due to the presence of records on the spindle, the front end of the bar 220 slides over a projection 222 on the lift arm 69 when the arm 69 is depressed by the control cam 52 into its extreme lower position. This serves to block the lift arms 68 and 69 and the shaft 70 against movement under the influence of the loading spring 175 so long as records remain on the spindle. Fig. 4 illustrates the parts under these conditions, with the roller 71 being held in a fixed outward position due to this blocking.

The stack of records 22 has been loaded into the storage position on the spindle 20, and it now remains to dislodge the lowermost record from the stack and place the same in playing position on the spindle 20 in order to initiate the playing of the record stack. Between the chart points 4 and 6 (Fig. 41), a cam follower 225 (Fig. 9) on the low lift arm 182 is engaged by an appropriate cam track 226 (Fig. 30) on the control cam 52. The lift arm 182 was released from the lift arm 178 when the roller 71 (Fig. 4) was locked in its outward position as shown, moving the pin 72 into a recess in the sliding collar 176. At point 4 on the timing chart (Fig. 41), the spindle plunger 123 is in the upper position thereof shown in Fig. 23. Between the chart points 4 and 6, the yoke 187 descends into the lower position thereof shown in Fig. 21, pushing the plunger 123 into its lowermost position. This effects the projection of the separator blades 130 and lugs 131 and the retraction of the supports 112, freeing the bottom record of the stack. This record thereupon falls by gravity until arrested by the lugs 131 on the separators 125. (If a record had been previously disposed in the playing position, such record would be released at this time to fall back into the tray.)

Between chart points 6 and 10 the low lift arm 182 is elevated by the cam track 226, pulling the spindle 123 into its uppermost position thereof, shown in Fig. 23. The dogs 116 and 118 are thrust out first, and the blades 130 and the lugs 131 are thereafter retracted. This permits the record that had previously been resting on top of the lugs 131 to drop onto the dogs 118, while the entire stack of records above the blades 130 falls until arrested by the dogs 116. Between chart points 10 and 12 the push rod or plunger 123 is moved back into its neutral position (Fig. 22). This causes the lugs 131 to emerge again, clamping the separated record at two points on the upper side thereof, while said record is supported at two points on the under side thereof by the dogs 118. The record is now ready for playing.

The slide 203 (Fig. 25) is under the tension of a spring 230 which acts upon a lever or pivoted plate 231 on the plunger rod 100 of the lower tone arm. The plate 231 performs a function similar to that of plate 108 described above. That is, it swings the lower tone arm in much the same manner that plate 108 swings the upper tone arm. Both of the plates 108 and 231 are pivotally connected to opposite ends of the slide 203. Between chart points 11 and 14 (Fig. 41) the control cam 52 rotates into a position such that the roller 201 (Fig. 25) is released and the slide 203 therefore moves under the influence of its tensioning spring 230. As the slide 203 thus moves, both of the attached plates 108 and 231 are swung for moving both of the tone arms 88 and 90 from the positions thereof shown in Fig. 13 to the positions thereof shown in Fig. 14, thereby bringing both of the pickup mechanisms 24 and 26 opposite the starting points on the upper and lower surfaces of the record 22 that is in playing position.

From chart point 14 to point 16 the control cam 52 completes this part of the change cycle by allowing a roller 233 (Figs. 4, 32 and 33) on the lever assembly 96 to drop down a slope on a cam track 234 with which it cooperates. This lowers the fork 94 on the end of the lever assembly 96, which previously had been holding a collar 235 (Figs. 33, 34 and 36) on the pivot rod 92 of the upper tone arm 88 in raised position. This release of the pivot rod 92 allows it to drop, and the tone arm 88 descends from the broken-line position thereof in Fig. 34, to the full-line position thereof, enabling the pick-up needle 97 to engage the groove in the record. Between the two indicated positions of the tone arm 88 in Fig. 34, there is a downward pivoting action (not shown) during which the tone arm 88 pivots about an edge of the pad 98. At the same time, the lever assembly 96 is disengaged from a latch member 237 (Figs. 10, 33 and 35). This latch member is biased upwardly by a spring 238, and it includes a lever 239 which is engaged with the lever 240 in the lever assembly 61 (Fig. 10) when the latch 237 is in its lower position. The lever assembly 61 is biased by a spring 241 (Figs. 4 and 9), so that when the lever 239 releases the lever 240, the lever assembly 61 moves under the influence of its spring 241 and disengages the hub portion 56 of the intermediate gear member 58 from the tread 55 of the spindle hub 54. The gear 59 on the intermediate 58 remains meshed with the gear 60 on the control cam 52. Thus, at the same time that the upper tone arm starts to travel across the record, the rotation of the control cam 52 stops, this occurring at point 16 of the timing chart (Fig. 41).

Near one end of the slide 203 there is disposed a lever 245 which is so biased by a spring 246 (Figs. 4 and 25) that it tends to swing beneath the lever assembly 96 when the slide 203 is moved away from the lever 245. This provides a blocking support for the lever assembly 96 so that it cannot move downwardly except at certain intervals even though the roller 233 is not supported by the cam 52. At the time when it is desired that the roller 233 descend, the slide 203 moves the lever 245 out of the way so that the lever assembly 96 can pivot in the manner just described.

*Bottom side playing*

When the upper tone arm 88 reaches the end of its inward travel as the top side of the record is played, a lever 250 (Figs. 4, 25, 34 and 36) on the pivot shaft 92 engages a trip lever 251 (Fig. 4). The lever 251 is very lightly biased by a spring 252 and is readily moved by the swinging lever 250. This causes the pointed end 253 of the lever 251 to move into the circular path of a pin 254 (Figs. 4 and 9) projecting upwardly from the rotating hub 54 on the spindle assembly. The pin 254 moves the lever 251 through a predetermined arc. A shoulder 255 on the lever 251 engages a roller 256 on a slide 258. The slide 258 thereupon is moved a short distance, after which the slide 258 is restored by its spring 261.

The slide 258 carries the roller 259 (Fig. 4) which engages an arm 260 of a cross-over lever 262 (Figs. 4 and 25) when the slide 258 is moved to the right as viewed in Fig. 4. The lever 262 is acted upon by a detent 263, which causes the lever 262 to be positioned in one or the other of two alternative positions. The arm 260 of the lever 262, in swinging, strikes a latch 264 (Fig. 4, 32 and 33) which couples together the two constituent levers 265 and 266 in the lever assembly 96. The latch 264 is disengaged, causing relative pivoting action to take place between the levers 265 and 266 under the influence of a compression spring 267 interposed between these levers. The lifting fork 94 for the upper tone arm assembly is on the lever 266, and as this lever rises, the pivot rod 92 of the upper tone arm 88 is pulled upwardly, causing the tone arm 88 to first contact an edge of the pad 98 (Fig. 34) and then be brought flush with this pad. The instant that the tone arm 88 engages the edge of the pad 98, the pick-up needle 97 is lifted out of the groove in the record, and as the pivot rod 92 continues to ascend, the tone arm 88 is clamped against the pad 98. The tone arm 88 is still at the inward end of its swing, where it remains for a time. The opposite end of the lever 266 places the latch bar 237 in readiness to hold the lever 240 in the lever assembly 61, which will be moved later on.

As a second incident to the aforesaid movement of the cross-over lever 262, the reversing switch 171 (Figs. 2 and 25) is moved into its reverse setting. This causes the reverse field winding 170 of the motor 36 to be energized, thereby reversing the rotation of the motor and the turntable. As a third incident to the shifting of the lever 262, the lower arm 270 of the lever 262 bears against a pin 271 on a brake lever 272 that cooperates with the periphery of a delay flywheel 273 (Figs. 4 and 37). The flywheel 273 has a ratchet connection (not shown) to a small pinion 274 that meshes with a toothed sector 275 on the end of the lever 104 that controls the raising and lowering of the lower tone arm pivot rod 100. The lever 104 has a lifting fork 276 on the end thereof that is received beneath a collar 277 on the lower tone arm mounting assembly. As the flywheel 273 is released from the brake 272, the lever 104 (Figs. 4 and 37) is acted upon by a spring 278, which pivots the lever 104 and causes the tone arm 90 to move from the broken-line position thereof into the full-line position thereof. This brings the lower pickup 26 (Fig. 8) upwardly until the pickup needle 280 thereof engages the under side of the record 22 that is in playing position. Intermediate the two indicated positions of the tone arm 90, there is a pivoting action of the arm 90 as it bears against an edge of the pad 103. The delay wheel 273 retards the engagement of the lower pickup needle with the under side of the record long enough so that the record can be brought up to full speed in the reverse direction. The lower tone arm then starts to move inwardly as the needle falls in the groove in the record.

*Lower tone arm restoration*

When the lower tone arm 90 moves into its limiting position, a lever arm 281 (Figs. 4, 25, 37, 39 and 40) strikes a trip lever 283 which is lightly biased by a spring 284. The lever 283 swings and brings its pointed end 285 into the circular path of the revolving pin 254 projecting upwardly from the spindle assembly. The lever 283 moves and bears against a roller 286 on a slide 287 (Fig. 4), pulling the slide 287 to the right as viewed in this figure. Such actuation of the slide 287 has four effects:

First, a roller 288 on the slide 287 presses down upon a lever arm 290 which is secured to a shaft 291. A pin 292 (Fig. 4) in the end of the shaft 291 (Figs. 4 and 37) acts upon the hub of the lever 104 which is pivotally mounted on the shaft 291 causing the lever 104 to be tilted in a direction for lifting the hub or collar 277 on the lower tone arm shaft 100. This raises the shaft 100 and brings the lower tone arm 90 against the pad 103, thereby tilting the lower pickup away from the record so that it clears the surface thereof.

As a second incident in the movement of the slide 287, a pin 294 therein strikes the lower arm 270 of the crossover lever 262. This brings the lever 262 back into its forward position, actuating the switch 171 back into the position thereof shown in Fig. 2.

As a third incident, a roller 295 on the slide 287 engages a turned end 296 on the lever 240 (Figs. 4 and 10) in the lever assembly 61. The lever 240 is tilted, and is latched by the lever 239. Through spring 298 the lever 240 moves a lever 300 in the lever assembly 61, bringing the intermediate member 58 back into operation. The hubs 56 and 55 are reengaged, and the control cam 52 resumes its motion which was interrupted when the top side of the record was played. A suitable pawl and ratchet mechanism 301 in the intermediate member 58 prevents any momentary reverse rotation of the gear 59 if the motor should still be coasting in a reverse direction at the time when the hub 56 first engages the tread 55. The control cam 52 operates only in a forward direction, and no cam time is required for governing the playing of the bottom side.

As a fourth incident to the shifting of the slide 287, the brake lever 272 is reapplied to the delay flywheel 273, so that the shifting lever 104 is clamped in its restored position. The ratchet connection between the pinion 274 and the flywheel 273 enables the lever 104 to be restored rapidly.

*The change cycle*

The control cam 52 resumes its rotation, as just explained, and between the chart points 0 and 3 (Fig. 41) it moves the tone arms 88 and 90 back to their rest positions shown in Fig. 13. The control cam 52 complishes this by shifting the lever 202 (Fig. 25) to move the slide 203 against the action of its spring 230. Also, the roller 233 (Figs. 4, 32 and 33) is lifted by the cam 52, pivoting the lever 265 until the latch 264 again couples the levers 265 and 266 together. This applies positive lifting force to the pivot rod 92 of the upper tone arm 88 (which previously had been lifted by the spring 267). The lever 265 is secured to the rock shaft 291. Hence, as the lever 265 is pivoted counter-clockwise, as viewed in Fig. 33, it acts upon the lever 104 (Figs. 4 and 37) through the medium of the shaft 291 to apply a positive lifting force to the pivot rod 100 for the lower tone arm 90. (Previously the rod 100 had been lifted by pivoting the lever 290.) Thus, the release and restoration of the slide 287 does not release the lower tone arm, which is held away from the record playing level thereof, and the upper tone arm likewise is held positively in a clear position.

As the slide 203 (Fig. 25) is moved, it acts upon the roller 204 and tries to force the lever 213 to the right as viewed in this figure. However, the sensing roller 216 encounters the unplayed record stack and prevents this. Such pulsing of the sensing roller 216 occurs during each change cycle until the last record is played. The action which takes place after the playing of the last record is completed will be described later. For the present, it will be assumed that more records are to be played and that a change operation must take place. The sensing attempt is made between the chart points 2 and 4 (Fig. 41).

Between chart points 4 and 6 the lower lift arm 182 (Figs. 4 and 9) is moved by the control cam 52 through a sequence of movements which will be described in connection with Figs. 21, 22 and 23. The push rod 123 moves from the position thereof shown in Fig. 22 down to the position shown in Fig. 21. This releases the bottom record in the stack so that it may fall down and be caught by the lugs 131. The record which has just been played simultaneously drops from the spindle 20 back into the tray below. The rod 123 then is lifted back through its neutral position, Fig. 22, into its upper position shown in Fig. 23. This transfers the record which has just been dropped from the stack into playing position, after which the spindle 123 is restored to its neutral position in Fig. 22, clamping this record in playing position. All of this occurs between the chart points 4 and 12 in Fig. 41.

Between the chart points 11 and 14 the tone arms 88 and 90 are moved into the positions thereof shown in Fig. 14 due to the shifting of the slide 203, Fig. 25. Between points 14 and 16 the roller 233, Figs. 4 and 33, drops, and the lever assembly 96 moves to permit engagement of the upper pickup 24 with the top side of the new record that is being played. At point 16 the lever assembly 96 releases the latch 237, Figs. 32 and 35, thereby releasing the lever 240, Figs. 4 and 10, so that the intermediate member 58 is disengaged from the driving hub 54. This stops the rotation of the control cam 52 while the top side of the new record is being played.

A shorting switch 305, Figs. 2 and 4, is arranged beneath the lever assembly 96. Whenever the shaft 291 is rocked to rock the lever 265 for clearing a pickup from the record, the switch 305 closes to short circuit the two pickups 24 and 26 so that no noise is allowed to enter the sound amplifier.

*Last record played*

The above described record playing and changing operations are repeated until the bottom side of the last record is played. When the lower pickup completes the playing of the under face, the over-travel of the lever arm 281, Fig. 4, moves the trip lever 283. The end of the trip lever is caught by the rotating pin 254 on the spindle assembly, causing the slide 287 to be actuated. As before, this disengagement of the lower pickup from the record snaps the cross-over lever 262 back into its forward position, while the associated lever 272 applies braking pressure to the flywheel 273. The lever assembly 61 is pivoted, bringing the intermediate member 58 back into play so that the control cam 52 starts to rotate. The motor 36 meanwhile has been reversed and is now rotating in its forward direction.

The control cam 52 rotates, and between the chart points 2 and 4, Fig. 41, the sensing roller 216, Figs. 25 and 26, is pulsed. This time the roller 216 does not encounter a record, consequently the lever 213 swings to the limit of its travel as the slide 203 is moved by the control cam 52. The slide 203 restores the tone arms to their rest positions by swinging the plates 108 and 231, and it holds the tone arms in rest position. The roller 233, Fig. 4, is moved upwardly by the cam 52, causing both of the tone arms to be moved the maximum distance vertically away from the record surfaces (the pickups having already been cleared from the record by other means acting upon the tone arms, as previously described).

When the lever 213 is pivoted, in the absence of any unplayed records on the spindle, it moves the sliding bar 220 rearwardly, or to the right as viewed in Fig. 4, retracting the end of this bar from the projection 222 on the lift arm 69. During this time, between the chart points 2.5 and 4.5, the extreme outer part of the cam 52 acts upon the roller 71 and presses the lift arms 68 and 69 to their lowermost extents. Hence, the sliding bar 220 is not placed under pressure nor prevented in any way from being moved, except for the bias of the spring 221.

From chart point 6 to point 8 the arms 68 and 69, Figs. 4 and 8, are permitted to rise a short distance by the control cam 52. This causes the pin 72 on the shaft 70 to turn a small amount, camming the collar 176 along the shaft 70. As a result of this, the lower lift arm 182 becomes interlocked with the high lift arm 178 in preparation for the next loading operation.

At the completion of the small vertical lift of the side arms 68 and 69, the arm 68 will have raised the slide 150, Figs. 4 and 18, a slight amount. The slide 150 at this time is resting on the projection 154 on the side arm 68. This elevates the lever 151 for releasing the L-shaped lever 152, Figs. 4 and 25, to the action of its spring 155. The lever 152 thereupon moves the idler plate 44, retracting the idler 40 and 46 from engagement with the motor 38 and the turntable 48, Fig. 13.

As another incident to this movement of the lever 152, the lever 156, Fig. 19, is swung against the action of its spring 160 to open the on-off switch 157. This switches off the record changer. It will be noted in Fig. 2 that the power supply to the record changer is not controlled by the on-off switch of the radio set. Hence, the record player can continue operating under the control of its record sensing means after the radio set is turned off. This prevents records from being left on the spindle. Furthermore, the main control knob 14, Figs. 1 and 15 of the record player cannot be moved past its "quick-stop" position so long as the lug 158, Fig. 19, is seated in the recess 161 of the cam 144. When the lever 152 moves to switch off the record player, it simultaneously releases the cam 144 from the projection 158, after which the control knob 14 may be moved into the "load" position thereof for raising the window 74 and allowing the tray to be removed.

The above described operation for play-automatic stop both sides, may be symbolized as follows:

1. The tray containing a stack of records is inserted into the player.
2. The main control knob 14 is set for Play-Automatic Stop.
3. The stack of records is transferred from the tray to the upper end of the downwardly projecting spindle 20, where the records are held in storage.
4. The bottom record of the stack is dropped part way down the spindle, is played successively on both sides and is then dropped back into the tray. At the same time a new record falls from the bottom of the stack into playing position.
5. This action is repeated until all of the records are played, after which the sensing roller movement results in a shut-down of the record player.

*Reject operation*

Any record side that is being played may be rejected by pressing the reject button 16 on the shaft 39, Fig. 4. This immediately terminates the playing of the record on that side and effects a change-over to the next side. That is, if the top side of the record is being played, the shift is made to the bottom side of the record. If the bottom side of the record is being played, the entire record is discarded and a new record is fed into playing position, to be played on the top side thereof.

As the reject button 16 is pressed, moving the shaft 39 inwardly, the inner end of the shaft 39 engages a leaf spring 308 which is anchored to a lever 309. Under ordinary circumstances the lever 309 is free to pivot, so that it moves and pushes an arm 310 pivotally connected thereto rearwardly. A roller 311 on the inner end of the arm 310 contacts the upturned edge of either lever 312 or 313, depending upon the position of the pin 307 carried by the cross-over lever 262. This pin 307 projects through a slot 306, Figs. 3, 5 and 39 in a plate 314. The pin 307 is disposed to one end or the other of the slot 306 depending upon whether the cross-over lever 262 (Figs. 4 and 25) is in its forward or reverse position. As shown in Fig. 4, the lever 262 is in its forward position for top side playing. The arm 310 is yieldingly guided by the turned-up ends of a spring wire 315, Figs. 5 and 6, which project through slots 316 in the edges of the plate 314. The ends of the wire 315 tend to keep the arm 310 centered on the plate 314, whereas the pin 307 cooperating with the roller 311 cams the arm 310 to one side or the other of this center.

Under the conditions illustrated in Figs. 4, 39 and 40, the roller 311 will be cammed into engagement with the lever 312 when the button 16 is pushed. The levers 312 and 313 are pivotally mounted on the plate 314. As the roller 311 bears against the upturned end of the lever 312, the lever 312 pushes against the pointed end 253 of the top side tone arm trip lever 251 and presses the end 253 into the path of the revolving pin 254 on the hub 54. The result of this action, as explained above, is to initiate a change-over immediately from top side to bottom side. The upper pickup 24 is removed from the record and the upper tone arm is held clear. The machine then starts to play the bottom side of the record.

If the bottom side of the record is being played, the pin 307, Figs. 4 and 39, on the cross-over lever 262 is positioned at the other end of the slot 306. The roller 311 on the arm 310 therefore is cammed against the upturned end of the lever 313. Lever 313, in being tilted, pushes the pointed end 285 of a bottom side tone arm trip lever 283 into the path of the revolving pin 254 on hub 54. This immediately starts a record change operation in the same fashion as though the trip lever had been moved by the swinging arm 281 associated with the lower tone arm.

The reject button 16 ordinarily would be pushed during the time when a record side is being played. However, no harm is done if the button 16 is pushed during any part of the record change cycle. A pin 318, Figs. 4, 10 and 11, on the intermediate control lever 240 cooperates with the lever 312, when the hub 54 is driving the control cam 52, to prevent the lever 312 from pivoting until the intermediate member 58 is released during the subsequent record-side playing operation. Hence if the button 16 is pushed in while a change cycle is taking place, the leaf spring 308, Fig. 4, merely is flexed without further effect until the pin 318 is withdrawn from the lever 312 at the conclusion of the change cycle.

*Quick stop*

If an entire stack of records or any unplayed portion thereof is to be rejected, the main control knob 14 is moved from a playing position to the "quick-stop position" Fig. 15. It is to be noted that the main control knob 14 cannot be moved further from the "quick-stop position" to its load position so long as any records are on the spindle, inasmuch as the lug 158, Fig. 19, must first be withdrawn automatically from the cam 144 before the control knob 14 can be returned to its "load" position. Moreover, moving the knob into "quick-stop position" does not interrupt the machine operation immediately, since the machine switches itself off automatically when the last record leaves the spindle and the operator has no control over this.

The "quick-stop" setting of the main control knob 14 becomes effective only when the knob 14 is returned thereto from one of the playing positions (automatic stop or continuous). When the knob 14 is moved to the "quick-stop position" on its way from the "load" position to one of the playing positions, the lost motion of the cam 144, Fig. 19, prevents the main power switch 157 from being turned on until the playing position of the knob 14 has been attained.

As soon as the knob 14 is returned to its "quick-stop" position from a "play" position, the machine immediately discontinues the playing of a record and starts feeding the records in close succession into the tray. The cam 140, Figs. 17 and 4, has on the rear face thereof a cam track 320 which cooperates with a roller 321 on the front end of the slide 287. In the "quick-stop" setting of the cam 140, the slide 287 is held continuously in its rearward position by the cam track 320. This shifting of the slide 287 causes the tone arms to move vertically so as to clear the surface of the record, snaps the cross-over lever 262 to the forward position (if lever 262 is not already in that position), applies the brake 272 to the delay wheel 273, and lastly, moves the lever assembly 61 to a latched position with respect to the latch member 237. The intermediate member 58 thereupon is engaged, and the control cam 52 starts to rotate. The roller 288 on the slide 287 holds the lever 290 down, thereby preventing the pickups from contacting the record surfaces at any time while the records are being moved through the "playing" position back to the tray. The cam 52 continues rotating, reciprocating the lift lever 182 up and down so that the records are dropped in close succession. The normal playing intervals are eliminated under these conditions since the lever 240 cannot be released to uncouple the control cam 52 from the driving hub 54. The tone arms 88 and 90 can be reciprocated continuously between their rest position (Fig. 13) and their starting position (Fig. 14), but the pickups 24 and 26 are not permitted to touch the records.

When the last record drops back into the tray, and the sensing roller 216 is pulsed in the usual manner, finding no record, the machine automatically cuts itself off.

*Play-continuous*

When it is desired that a single tray of records be played repeatedly by the machine, the main control knob 14 is set in the "play-continuous" position, Fig. 15. This brings the point 164 on the cam 146, Fig. 20, against the cam follower 166, shifting the lever 152, Figs. 4 and 25. In this instance the point 164 remains in contact with the follower 166. (It will be recalled that when the machine was set for "play-automatic stop" operation as explained previously, the point 162 contacted the follower 166 only momentarily when the control knob was being moved to the "play-automatic stop" position.)

When the lever 152 is blocked by the cam 146, it cannot be released to shut the motor 36 off as the last record in the stack is played and returned to the tray. The drive motor 36 therefore continues to run, and the control cam 52 continues to operate. This commences a new record cycle just as though a new tray of records had been inserted in the machine and the control knob 14 had been turned to one of the playing positions.

Thus, when the machine is playing continuously, it does not shut itself off automatically. A user who is unfamiliar with the apparatus may think that by switching off the radio set, he has done all that is necessary and that the record player will cut itself off automatically when it finishes playing the stack of records then on the spindle. To circumvent this, there is provided a small switch 325, Figs. 2 and 16, in association with the cam 80. The switch 325 parallels the on-off switch of the radio set, and when the cam 80 is in "play-continuous" position, the switch 325 is held closed. Therefore, the user cannot turn off the dial light in the radio set so long as the record player control knob is set in its "play-continuous" position. This warns the user that a further step must be taken before he can leave the set, which means that the record player control knob 14 must be set either in the "automatic-stop" or "quick-stop" position thereof. The switch 325 then opens, extinguishing the radio set dial light. If desired, the cam 80 may be so designed that the radio set can be turned off only when the knob 14 is in its "quick-stop" position. In either event, the record player continues to function until the last record is returned to the tray.

*Playing of top sides only*

Thus far it has been assumed that the machine is to play both the top and bottom sides of each record, except as this may be modified by employing the reject button 16 for individual record sides. If the bottom sides of all records are to be rejected, it is more convenient to use the control knob 18, which is set to the "top-side" position thereof. This causes all of the records to be played on the top sides thereof and prevents the lower tone arm and pickup from being effective at all. Since no control cam time is utilized in normal dual-side playing to change over from top side to bottom side, the changing interval remains substantially the same between two successive top-side playings in the present operation as it would be between successive records in normal dual-side playing. Top-side playing may be desired where the record series is arranged to be played through first on one side, then on the other.

Referring to Figs. 4, 27, 28 and 29, a cam 330 is mounted on the shaft 40 which carries the knob 18. When the knob 18 is turned to the top-side position, the flat 331 on the cam 330 moves out of contact with an arm 332, and the cam 330 causes the arm 332 to pivot a lever 333 that is spring-connected thereto. The lever 333 depresses a sliding post 335 that is linked to the slide 258. This causes the slide 258 to slant as shown, with the result that when the slide 258 is actuated by the lever 251, at the conclusion of any top-side playing, the slide 258 causes a roller 336 (Fig. 29) thereon to engage a slanting edge 337 on the lever 240. As a result of this, lever 240 is latched in its active position by the latching members 237 and 239, and the cross-over lever 260 is not actuated, being left in the position for top-side playing. Hence the intermediate device 58 is engaged with the spindle hub 54, and the control cam 52 operates to effect a normal record change cycle as described above. The next record is brought down into playing position, and the top side of this new record is played as usual.

If the knob 18 is moved to "top sides only" position at a time when the roller 259 on the slide 258 is engaged with the lever arm 260, the connecting spring 338, Fig. 27, yields until such time as the post 335 is free to move when slide 258 is fully returned by its spring 261. If the lever 240 is engaged by the roller 336 on the slide 258 when the knob 18 is moved to "bottom sides-top sides" position, the lever 333 will merely be lifted away from the post 335, which will not be raised by spring 339 until the travel cycle of the slide 258 is completed.

It will be noted that both of the rollers 259 and 336 have lipped edges, as shown best in Fig. 29, and their companion levers 240 and 260 have beveled edges cooperating therewith. Hence, once these rollers are engaged with their companion levers, neither one can slip off until it has completed its return travel. This enables the "bottom side-top side" knob 18 to be set in either position at any time without interference, even though the slide 258 may be in some part of its travel cycle.

SUMMARY

The illustrated record player is of small size, requires very little power for its operation and is constructed of lightweight, cheap parts. It is easy to assemble and service because of the fact that substantially all of the operating mechanisms are accessible from the top of the chassis, so that the record player is in its normal position of use when the parts are being assembled or repaired. Unlike many record changers, the illustrated construction does not require that parts be oriented by hand in any particular fashion with reference to the control cam when being assembled or replaced.

The tray storage and loading feature is of inestimable value. The trays are far more convenient to use than the standard record album. To load a stack of records into the machine, one merely removes the desired tray from storage and places the tray into the machine. The tray is locked in and cannot be removed until all of the records have been returned to it. The fact that all of the records are returned automatically to the same tray from which they were taken, and in the same sequence, enormously simplifies the handling of the records by the user. It spares the records from damage due to individual handling and preserves the quality of reproduction obtainable from the records.

The machine not only provides for two-sided record playing in a simpler and more economical fashion than has been accomplished heretofore, but it also affords several control features which greatly increase the utility of the machine. For instance, the main control knob can be set for playing a single stack of records just once or repeatedly, as desired, in the manner explained hereinabove. Individual record sides can be rejected by means of the reject control, or any number of unplayed records can be rejected by the "quick-stop" portion of the main control, as explained above. Rejection of all the bottom sides can be accomplished with the "top side only" control.

By building the record player into a cabinet so that no access can be had to the operating parts thereof, I have insured that no damage will be done to the mechanisms by inexperienced or careless persons who might try to maneuver the parts by hand or make ill-advised changes. Besides these advantages, there are many others which have been specifically mentioned above, or which may readily occur to those skilled in the art.

While there has been illustrated and described a preferred embodiment of the invention, it will be understood that various modifications of such embodiment may be made without departing from the true spirit and scope of the invention as defined in the appended claims.

I claim:

1. An automatic record player for playing a plurality of disc records having center openings therein, such record player comprising a downwardly extending rotatable spindle, means for supporting a plurality of disc records beneath said spindle in vertical alignment therewith, vertically movable carrier means for moving said supporting means to a storage position in which the records as a group are positioned with said center openings about said spindle, record handling means on said spindle for retaining the records temporarily in said storage position and for holding the records one at a time in a given playing position on said spindle, said carrier means returning said supporting means to a position beneath said spindle when said records are retained in said storage position and means for operating said record handling means to move the records individually from said storage position to said playing position and to release the played records from said playing position whereby the records are returned to said record supporting means.

2. An automatic record player for playing a plurality of disc records, such record player comprising a downwardly extending rotatable spindle, means for supporting a plurality of disc records in vertical alignment with said spindle, means for moving said record supporting means to place the records on said spindle, record handling means on said spindle for holding the records temporarily in a storage position on said spindle and for supporting the records successively in a playing position on said spindle, means for rotating said spindle, phonographic pickup means cooperating with the record that is in playing position, and means for operating said record handling means to individually move the records successively from said storage position to said playing position and to individually release the played records from said spindle to return the same to said record supporting means.

3. An automatic record player for playing a plurality of disc records, such record player comprising a rotatable spindle, means for supporting a plurality of disc records in axial alignment with said spindle, carrier means for moving said record supporting means to place the records on said spindle, record handling means on said spindle for holding the records in a temporary storage position on said spindle and for supporting the records individually and successively in a playing position on said spindle, and ejecting means for causing said record handling means to individually eject the played records from said spindle to said record supporting means.

4. In a disc record player, a hollow rotatable spindle adapted to be received in the center holes of a stack of disc records, means supporting said spindle for rotation about a vertical axis, vertically extending support levers mounted within said spindle, said support levers having upper projections thereon defining a record storage position for the stack of records and lower projections thereon for supporting a record in playing position, separator levers mounted within said spindle, said separator levers having blades thereon aligned with the lower surface of the second record in the stack, and vertically reciprocable cam means within said spindle for pivoting said support levers and said separator levers in sequence to release a record from the storage position simultaneously with the release of a record from the playing position, said spindle having apertures therein for enabling said upper and lower projections and said blades to be alternately extended through and withdrawn into said spindle as said cam means is operated.

5. In a disc record player, a hollow rotatable spindle adapted to be received in the center holes of a stack of disc records, means supporting said spindle for rotation about a vertical axis, vertically extending support levers mounted within said spindle, said support levers having upper projections thereon defining a record storage position for the stack of records and lower projections thereon for supporting a record in playing position, vertically extending separator levers mounted within said spindle, said separator levers having blades aligned with the lower surface of the second record in the stack and also having lug means below said blades for engaging the bottom side of a record dropped from the stack toward playing position and the top side of a record in playing position, and vertically reciprocable cam means within said spindle for pivoting said support levers and said separator levers in sequence to release the bottom record from storage position while releasing a record from the playing position, with the record that is released from storage position coming to rest first on said lug means and then being clamped between said lug means and said lower projections in playing position.

6. In a disc record player, a hollow rotatable spindle adapted to be received in the center holes of a stack of disc records, record support levers mounted within said spindle and adapted to swing radially thereof, record separator levers mounted within said spindle and adapted to swing radially thereof, an axially shiftable rod positioned concentrically within said spindle, cam means on said rod engageable with all of said levers for actuating the same in sequence, said rod having axially spaced shoulder portions thereon, a reciprocatory shifting member normally disposed between said shoulders and being movable in alternate directions to engage said shoulders alternately for shifting said rod and said cam means, and detent means acting upon said rod for yieldably retaining the same in a position such that said shoulders thereon are spaced from said shifting member in the normal position thereof, whereby said shifting member does not have frictional contact with said shoulders.

7. In a disc record player, a hollow rotatable spindle, support members within said spindle adapted to swing radially thereof, separator levers within said spindle adapted to swing radially thereof, a rod extending along the axis of said spindle and being axially movable relative thereto, cam means on said rod engageable with said levers to actuate the same in sequence during a record changing operation, said rod having axially spaced shoulder portions thereon, a reciprocatory shifting member disposed between said shoulders, such shifting member having a limited amount of free play relative to each of said shoulders, an annular groove in said rod, and a series of spring-pressed detent balls bearing radially against said rod for yieldably retaining said rod in a position such that said shoulders are clear of said shifting member in the normal position thereof, whereby said shifting member does not have any frictional contact with said shoulders.

8. In an automatic record player, a hollow rotatable spindle adapted to be received in the center holes of a stack of disc records, a pair of support levers mounted within said spindle for pivotal movement radially thereof, said support members having upper projections thereon defining a record storage position on said spindle and lower projections thereon defining a record playing position on said spindle, a pair of separator levers mounted within said spindle substantially in quadrature relationship to said support levers and being adapted to pivot radially of said spindle, each of said separator levers having a blade thereon insertable within the bottom and second records of the stack in storage position and also having lug means thereon for clamping a record against the lower projections of said support levers, and axially movable cam means within said spindle for actuating said support levers and said separator levers in sequence to effect a record change operation.

9. In an automatic record player, a hollow rotatable spindle mounted in a vertical position, said spindle being receivable in the center holes in a stack of disc records, a plurality of vertically extending levers pivotally supported in said spindle for radial movement relative thereto, said spindle having apertures therein aligned with said levers, storage projections on certain of said levers insertable through corresponding apertures in said spindle for supporting a plurality of records in a temporary storage position on said spindle, separator blades on certain of said levers insertable between the bottom record and the second record in the stack which is being supported in said temporary storage position, lug means on certain of said levers below said separator blades insertable through said spindle for momentarily arresting a record dropped from said temporary storage position, still other projections on certain of said levers disposed below said lug means for supporting a record in a playing position on said spindle, and axially movable cam means within said spindle cooperating with said levers to actuate the same in sequence during a record changing operation, said cam means having a first position in which only said separator blades and said lug means are extended through said spindle, a second position in which all of said projections along with said separator blades and said lug means are extended through said spindle, and a third position in which only said storage projections and said other projections are extended through said spindle.

10. An automatic record player comprising a hollow rotatable spindle supported for rotation about a vertical axis, carrier means normally disposed below said spindle for supporting a stack of disc records, movable supports within said spindle having first projections thereon for holding records in a temporary storage position on said spindle and having second projections thereon for holding a single record in a playing position below said storage position on said spindle, means for elevating said carrier means to move the stack of records thereon into said storage position on said spindle and for thereafter lowering said carrier means to the normal position thereof below said spindle, separators within said spindle having blades adapted in one position thereof to retain all records except the bottom record in said storage position, and cam means within said spindle cooperating with said supports and said separators to actuate the same, said cam means having a first position in which both said supports and said separators are retracted into said spindle, a second position in which only the projections on said supports protrude through said spindle, a third position in which all of said projections and said separator blades protrude through said spindle, and a fourth position in which only said separator blades protrude through said spindle.

11. An automatic record player as set forth in claim 10, wherein said separators also have lug means thereon movable in unison with said separator blades for momentarily arresting a record dropped from said storage position toward said playing position and for thereafter clamping the upper side of a record held by said second projections in playing position.

12. An automatic record player comprising a portable tray for supporting a plurality of disc records, rotatable record holding means for supporting records successively in a playing position, phonographic pickup means cooperable with each record when in playing position, a cabinet enclosing said record holding means and said pickup means, said cabinet having an opening therein to permit the insertion of said tray containing records into said cabinet, record carrying and handling means for transferring the records from said tray to said record holding means and returning the played records to said tray in their original sequence, a movable member adapted to block said opening in said cabinet, means for retracting said member to permit insertion of said tray and for returning said member to its blocking position after the tray is inserted in the cabinet, sensing means for detecting the presence of records in said record holding means, and an interlocking device controlled by said sensing means and mechanically coupled to said retracting means for holding said member in a position blocking said opening so long as a record is retained by said record holding means.

13. An automatic record player comprising a portable tray for supporting a plurality of disc records, rotatable record holding means for supporting records successively in a playing position, phonographic pickup means cooperable with each record when in playing position, a cabinet enclosing said record holding means and said pickup means, said cabinet having an opening therein to permit the insertion of said tray containing records into said cabinet, record carrying and handling means for transferring the records from said tray to said record holding means and returning the played records to said tray in their original sequence, a movable member adapted to block said opening in said cabinet, a manually operable control shaft, cam means on said control shaft adapted to move said member into and out of its blocking position in accordance with the positioning of said control shaft, sensing means for detecting the presence of records in said record holding means, and detent means controlled by said sensing means engaging a portion of said control shaft for holding the same in a position such that said cam means retains said member in its blocking position so long as a record is retained by said record holding means.

14. An automatic record player comprising a portable tray for supporting a plurality of disc records, a housing having an opening therein for receiving said tray, a movable blocking member adjacent said opening, rotatable control means having a first position to permit withdrawal of said blocking member from said opening and a second position in which said control means maintains said blocking member across said opening, record handling and record playing means within said cabinet for withdrawing records from said tray to play the same and for returning the played records to said tray, said control means being effective when in said second position thereof to cause said record handling and said record playing means to operate, sensing means adapted to sense when all records are released from said record handling and record playing means, and interlock means controlled by said sensing means engaging a portion of said control means for preventing the rotation of said control means from its second position to its first position if all of the records are not released from said record handling and record playing means.

15. An automatic record player for playing a stack of disc records which normally are kept in a portable tray, such record player comprising a cabinet having an opening therein to receive a tray containing records, a movable blocking member adjacent said opening, rotatable control means having a first position and a second position, record handling and record playing means in said cabinet controlled by said control means, said control means permitting the operation of said record handling and record playing means only when said control means is in said second position thereof, and mechanism actuated by said control means for moving said blocking member across said opening when said control means is rotated into the second position thereof and for enabling said blocking member to be withdrawn from said opening as said control means is rotated back into the first position thereof, said mechanism including interlock means interconnecting said control means and said member for preventing the rotation of said control means into its second position if the movement of said member across said opening is obstructed.

16. An automatic record player for playing a stack of disc records which normally are kept in a portable tray, such record player comprising a cabinet having a slot therein for the insertion of a tray into said cabinet, a downwardly extending rotatably spindle within said cabinet, a vertically movable carrier within said cabinet for receiving a tray of records inserted through said slot and for moving the records onto said spindle, a movable window adjacent said slot, control means for moving said window to a closed position across said slot, operating means for said carrier under the control of said control means, said control means being effective to cause the operation of said operating means only when said window is fully closed, and a member cooperating with the tray in said carrier having a portion positioned to engage a portion of said window when the tray is partially inserted into said carrier for obstructing the movement of said window to said closed position.

17. An automatic record player comprising means for supporting a stack of disc records to be played, record changer means for positioning said records individually in a record playing position, pickup means to play the records, a control cam, a driving member for rotating the record in record playing position, an intermediate member between said driving member and said control cam movable into and out of a position for coupling said driving member to said control cam, a latch for retaining said intermediate member in its coupling position, follower means cooperating with said control cam for bringing said pickup means into cooperation with a record that is to be played, means controlled by said follower means for releasing said latch when said pickup means starts to play a record, means biasing said intermediate member into its uncoupling position when said latch is released, thereby stopping the rotation of said control cam, and means controlled by said pickup mechanism when the playing of a record is finished for moving said intermediate member back into its coupling position thereby to continue the rotation of said control cam, said record changer means being operated by said control cam.

18. A two-sided automatic record player comprising means for supporting a plurality of disc records to be played, record changer means for positioning said records individually in a record playing position, means for playing each record on both sides thereof including pickup means having first and second tone arms respectively cooperable with opposite sides of a record for playing the same, a rotatable control cam, a driving member for rotating said records and for driving said control cam, an intermediate member between said driving member and said control cam movable into and out of a position for coupling said driving member to said control cam, a latch normally retaining said intermediate member in its coupling position, follower means operated by said control cam for bringing said first tone arm into a position for playing one side of the record, said follower means also including means to release said latch, means biasing said intermediate member away from its coupling position when released from said latch, means controlled by said first tone arm when the playing of one side of the record is finished for bringing said second tone arm into cooperative relation with the second side of the record while said control cam is stationary, and means controlled by said second tone arm when the playing of the second side of the record is finished for restoring said intermediate member to its coupling position, said record changer means being controlled by said cam.

19. An automatic record player comprising a rotatable record support, reversible driving means for driving said record support, a rotatable control cam, an intermediate member movable into and out of coupling position for intermittently coupling said cam to said rotatable record support, first and second tone arms respectively cooperable with opposite sides of a record on said record support, follower means controlled by said cam for bringing said first tone arm into cooperation with the first side of said record, mechanism controlled by said follower means for uncoupling said intermediate member to stop the rotation of said control cam when said first tone arm is brought into record-playing position, change-over means controlled by said first tone arm for retracting said first tone arm from said record when said first side is played and for bringing said second tone arm into cooperation with the opposite side of said record, means under the control of said change-over means for reversing the rotation of said driving means, other change-over means controlled by said second tone arm for retracting said second tone arm from said record when the playing of the second side thereof is concluded, mechanism controlled by said other change-over means for restoring said intermediate member to its coupling position, and means controlled by said cam for restoring said tone arms to their initial positions.

20. A record player as set forth in claim 19, including in combination therewith, record changer means mounted on said record support, and means actuated by said control cam for operating said record changer means.

21. An automatic record player comprising a horizontal chassis, rotatable spindle means journaled in said chassis and extending downwardly therefrom, retractile record holding means on said spindle means for holding disc records that are to be played, said retractable record holding means including an operating portion extending on the upper side of said chassis, a hub on said spindle means rotatable therewith and disposed above said chassis, a control cam disposed on the upper side of said chassis, intermediate coupling means between said hub and said control cam, pickup means for playing the records on said spindle means, said pickup means being mounted on said chassis and having operating portions extending on the upper side of said chassis, means for rotating said spindle means, and mechanical coupling means mounted on said chassis including portions engaging said control cam, said pickup operating means and said retractable record holding means for playing and changing the records on said spindle.

22. An automatic record player comprising a horizontal chassis, a rotatable spindle means journaled in said chassis and extending downwardly therefrom, retractile means on said spindle means for supporting records to be played, pickup means for playing the records on said spindle means, a tray carrier for supporting a record tray beneath said spindle, a hub rotatable with said spindle and disposed above said chassis, a control cam journaled on the upper side of said chassis, means for coupling said hub to said control cam, means for rotating said spindle means, instrumentalities controlled by said control cam to actuate said pickup means and said record supporting means for playing and changing records on said spindle, and other instrumentalities controlled by said control cam for elevating and lowering said tray carrier.

23. In an automatic record player adapted to play records which normally are kept in a portable tray, a horizontal chassis, a rotatable spindle journaled in said chassis and extending downwardly therefrom, a control cam journaled on the upper side of said chassis and coupled to said spindle, means for rotating said spindle, a carrier beneath the spindle in axial alignment therewith for receiving a tray of records, record supporting means on said spindle, and a lever system fulcrumed on said chassis and connected to said carrier, said lever system being controlled by said control cam for elevating and lowering said carrier to transfer the records from the tray to said record supporting means.

24. An automatic record player comprising a rotatable spindle, first means on said spindle for supporting a stack of disc records in a temporary storage position, second means on said spindle for supporting one record at a time in a playing position on said spindle, said first and second supporting means being operable by a plunger disposed within said spindle for individually and successively bringing records from said temporary storage position to said playing position and for returning records from said playing position to a permanent storage position in the record player, means for rotating said spindle, a control cam, an intermediate member movable into and out of a position for coupling said control cam to said spindle, pickup elements cooperable with a record in playing position, follower means controlled by said cam for periodically uncoupling said control cam from said spindle means, control means for bringing the pickup elements into cooperation with the record in playing position while said cam is stationary, means normally controlled by said pickup elements when a record is played for moving said intermediate member into its coupling position to resume the rotation of said control cam, special control means operatively connected to said intermediate member for holding the same in the position to maintain said control cam coupled to said spindle, and record changer means operated by said control cam while the same is rotating for actuating said plunger to change records on said spindle.

25. A two-sided automatic record player comprising a rotatable spindle assembly for holding a record in position to be played on both sides thereof, reversible driving means for driving said spindle assembly, a rotatable control cam, an intermediate coupling member movable into and out of a position for coupling said cam to said spindle assembly, pickup elements respectively cooperable with both sides of the record, record changer means operated by said control cam while the same is rotating to move a new record into playing position on the spindle, follower means cooperating with said cam for bringing one of said pickup elements into cooperation with the record and for moving said intermediate member into a position for uncoupling said cam from said spindle assembly, thereby stopping the rotation of said cam, a slide, mechanism controlled by said one pickup element for causing said slide to be actuated at the conclusion of the travel of said pickup element across the record, a change-over lever normally positioned to be engaged by said slide when the same is actuated, means controlled by said change-over lever for reversing the rotation of said spindle assembly and for bringing the second pickup element into cooperation with the second side of the record that is being played, mechanism controlled by said second pickup element and effective when said second pickup element has completed its travel over the record to restore said change-over lever to its initial position and to bring said intermediate member back into coupling relation with said spindle assembly and said cam, special control means operable when only one side of each record is to be played for preventing said slide from engaging said change-over lever, said special control means also including provisions for causing said intermediate member to couple said cam to said spindle assembly to resume rotation thereof when the playing of one record side has been completed, and record changer means disposed in part within said spindle assembly and actuated by said control cam when the same is rotating to bring a new record into playing position.

26. An automatic record player comprising a rotary record support, a reversible driving means for rotating said record support, a control cam, an intermediate coupling member movable into a coupling position for transmitting power from said record support to said control cam, a first pickup member for playing one side of a record on said record support, a second pickup member for playing the other side of a record on said record support, a hub rotatable with said record support, a pin on said hub, a pair of levers each having a free end portion that is movable into and out of the orbit of said pin, means for bringing one of said pickup members into cooperation with the record, an arm controlled by said first pickup member and effective when the playing of one record side is completed to tilt one of said levers so that the same is engaged by said pin, a change-over device having two alternate positions, said change-over device functioning when said first lever is moved by said pin to reverse the rotation of said record support and to bring said second pickup member into cooperation with the second side of the record, an arm on said second pickup member for tilting said second lever into a cooperative relation with said pin, said change-over device functioning when said second lever is actuated by said pin to prepare the record player for playing the first side of a new record, a reject button, a push member yieldably connected to said reject button, a pair of secondary levers respectively adapted to pivot said first-mentioned pair of levers, said push member being adapted to move against either of said secondary levers, and a projection on said change-over device for guiding said push member in accordance with the position of said change-over device so that the appropriate secondary lever is actuated to change the record side that is being played.

27. An automatic record player for playing a plurality of disc records, comprising means for supporting the records in an inactive position, means defining a space for the temporary storage of records to be played, means defining a position at which records are played successively, a spring-biased member settable from a normal inactive position to an active position for causing the record player to operate, a blocking member normally effective to prevent the return of said control member to its inactive position, carrier means operable when said control member is set to its active position for moving the records as a group from said inactive position to said temporary storage space, holding means normally effective to prevent a repeat operation of said carrier means while said control member is in its active position, means effective while said record player is operating to transfer records intermittently from said storage space to said playing position, means for playing each record while in playing position, means for returning the played records to said inactive position, a record sensing member for detecting when the last record has left said storage space, stop means controlled by said sensing member for rendering said blocking member ineffective to prevent the return of said control member to its inactive position when the last record has left said storage space, and continuous playing means for superseding said stop means and for periodically releasing said carrier means from said holding means whereby the records are played repeatedly in a given sequence so long as said continuous playing means is effective.

28. A disc record player including in combination, a rotatable spindle adapted to be received in the center holes of a stack of disc records, said spindle having portions for centering said records thereon, means supporting said spindle for rotation about a vertical axis, support lever means mounted on said spindle having upper portions defining a record storage position for the stack of records and lower portions for supporting a record in playing position, separator lever means mounted on said spindle having blade portions thereon aligned with the lower surface of the second record in the stack, and cam means on said spindle movable to positions engaging said support lever means and said separator lever means for operating the same in sequence to release a record from the storage position simultaneously with the release of a record from the playing position, said upper and lower portions of said support levers and said blade portions of said separating levers being alternately extended beyond said centering portions of said spindle and withdrawn therefrom as said cam means is operated.

29. In a disc record player, a rotatable spindle adapted to be received in the center holes of a stack of disc records, record support levers mounted on said spindle and adapted to swing radially thereof, record separator levers mounted on said spindle and adapted to swing radially thereof, an axially shiftable rod positioned concentrically within said spindle, cam means on said rod engageable with all of said levers for actuating the same in sequence, a reciprocatory shifting member movable in alternate directions for shifting said rod and said cam means, said rod and said member including coupling portions for providing a lost motion connection therebetween, and means acting upon said rod for yieldably retaining the same in an intermediate position such that said coupling portion thereof is spaced from said coupling portion of said shifting member in the normal position thereof, whereby said shifting member does not have frictional contact with said rod.

30. A two-sided automatic record player including in combination, means for supporting a plurality of disc records to be played, record changer means for individually moving said records to a record playing position, means for playing each record on both sides thereof including driving means and pickup means having first and second tone arms respectively cooperable with opposite sides of a record for playing the same, rotatable control cam means, an intermediate member between said driving means and said control cam means, movable into and out of a position for coupling said driving means to said control cam, follower means operated by said control cam means for bringing said first tone arm into a position for playing one side of the record, means controlled by said first tone arm when the playing of one side of the record is finished for bringing said second tone arm into cooperative relation with the second side of the record while said control cam means is stationary, means controlled by said second tone arm when the playing of the second side of the record is finished for moving said intermediate member into said coupling position, said follower means including means for moving said intermediate member out of said coupling position, said record changer means being controlled by said control cam means.

31. An automatic record player for playing a plurality of disc records having center openings therein, said record player including in combination, a downwardly extending rotatable spindle, means for supporting a plurality of disc records beneath said spindle in vertical alignment therewith, vertically movable carrier means for moving said supporting means to a first upper position in which the records as a group are positioned with said center openings about said spindle, record handling means on said spindle for retaining the records temporarily in said first position and for holding the records one at a time in a second lower position on said spindle, said carrier means returning said supporting means to a position beneath said spindle when said records are retained in said first position, and means for operating said record handling means to move the records individually from said first position to said second position, and to release the records from said second position whereby the records are returned to said record supporting means.

32. An automatic record player for playing a stack of disc records which normally are kept on a portable tray, said record player including a housing having an opening therein to receive a tray containing records, record handling and record playing means in said housing for playing the records in a tray positioned therein, operating means for said record handling and record playing means, control means including an operating member movable between first and second positions, said control means including a portion movable to a position for blocking said opening in said housing when said control means is in said second position, said control means being coupled to said operating means and causing operation thereof when said operating member is in said second position, said control means being ineffective to cause operation of said operating means when movement of the blocking portion thereof across said opening is obstructed.

33. An automatic record player for playing a plurality of disc records having center openings, which records may be received in the player on a portable tray, said record player including in combination, vertically extending rotatable spindle means having an upper end mounted for rotation and a free lower end, receptacle means positioned below said lower end of said spindle means for slideably receiving a tray and records therein in a position such that the center openings of the records are in vertical alignment with said spindle means, record handling means on said spindle means including a portion for holding the records temporarily in an upper storage position on said spindle means and a portion for supporting the records individually in a lower playing position on said spindle means, means for rotating said spindle means, means for transferring the records from the tray along said spindle means to said record handling means on said spindle means, with the tray being continuously held in alignment with said spindle means and being positioned below said playing position when the records are transferred to said storage position, phonographic pickup means cooperating with the record that is in playing position, and means for operating said record handling means to individually drop the records along said spindle means successively from said storage position to said playing position, and to individually release the played records from said playing position clear of said spindle means to return the same to the portable tray.

34. Automatic record changing apparatus for operation with disc records having center openings therein, and which records are held substantially horizontally on portable trays having open tops, said apparatus including in combination, a frame structure having a portion for slideably receiving in a horizontal position therein a portable tray with records supported thereon, elongated vertically extending spindle means supported at its upper end on said frame structure in vertical alignment with the openings in records on a tray in said receiving portion, said spindle means having a free lower end positioned above records on a tray in said receiving position, said spindle means having an upper portion with retractible means extending outwardly therefrom for holding a plurality of records and a lower portion having outwardly extending means for holding a single record in a playing position, automatic means for transferring all the records from a tray placed in said receiving portion along said spindle means to said upper portion of said spindle means, with the records and the tray being moved vertically with respect to each other so that the records are held above the tray, and means for operating said record holding means on said spindle means for individually dropping said records from said upper portion to said lower portion and for dropping the record on said lower portion clear of said spindle means and into the portable tray.

35. In a disc record player, vertically extending rotatable spindle means mounted for rotation at the upper end thereof, said spindle means having peripheral record guiding portions and openings extending into the interior of the spindle means, said spindle means being adapted to be received in the center holes of a stack of disc records, means supporting said spindle means for rotation about a vertical axis, a plurality of support levers mounted within said spindle means and adapted to extend therefrom, said support levers having upper projections thereon defining a record storage position for the stack of records and lower projections thereon for supporting a record in playing position, a plurality of separator levers mounted within said spindle means and having blade portions thereon aligned with the lower surface of the second record in the stack at the storage position, said separator levers also having portions adapted to engage the upper surface of a record in said playing position and cooperating with said support levers to hold a record fixed in the playing position, said support levers and said separator levers being positioned during record playing operations so that said projections of said support levers and said portions of said separator levers extend through said openings beyond said record guiding portions to hold records in said storage and playing positions, and movable cam means within said spindle means for moving said support levers and said separator levers in sequence, with said projections being withdrawn into the interior of said spindle means to release a record from the playing position and to release a record from the storage position, and with said portions of said separator means being withdrawn into the interior of said spindle means to drop additional records on said projections of said support levers.

36. Automatic record changing apparatus for operation with disc records having center openings therein, said apparatus including in combination, a frame structure, a portable tray for receiving a plurality of records and having a substantially flat bottom portion and means extending upwardly from said bottom portion including a cylindrical portion conforming to an edge of the records for confining a plurality of horizontally positioned disc records in vertical alignment on said bottom portion, said upwardly extending means including a front portion forming a drawer front for closing the receiving opening and to facilitate handling said tray, said tray having an open top and said cylindrical portion confining records held thereon so that records may be placed in said tray and removed therefrom only through the open top, elongated vertically extending spindle means having an upper end supported on said frame structure and a free lower end, said frame having a portion beneath said spindle means for receiving said tray with records thereon so that the openings in the records are aligned with said spindle means, said spindle means having an upper portion with retractible means extending outwardly therefrom for holding a plurality of records and a lower portion having outwardly extending means for holding a single record in a playing position, automatic means for transferring all the records from the tray in said receiving portion through the open top thereof along said spindle means to said upper portion of said spindle means, with the records and the tray being moved vertically with respect to each other so that the records are held above the tray, and means for operating said record holding means on said spindle means for individually dropping said records from said upper portion to said lower portion and for dropping the record on said lower portion clear of said spindle means and into the portable tray.

References Cited in the file of this patent

UNITED STATES PATENTS

| | | |
|---|---|---|
| 785,362 | Johnson | Mar. 21, 1905 |
| 1,213,990 | Wolcott | Jan. 30, 1917 |
| 1,469,152 | Boumphrey | Sept. 25, 1923 |
| 1,568,130 | Blackwell | Jan. 5, 1926 |
| 1,879,291 | Johnson et al. | Sept. 27, 1932 |
| 1,920,628 | Browning | Aug. 1, 1933 |
| 2,043,789 | Ansley | June 9, 1936 |
| 2,097,323 | Hill | Oct. 26, 1937 |
| 2,244,157 | Hokanson | June 3, 1941 |
| 2,293,723 | Erikson | Aug. 25, 1942 |
| 2,330,383 | Roe | Sept. 28, 1943 |
| 2,344,919 | Kelly | Mar. 21, 1944 |
| 2,506,926 | Johnson | May 9, 1950 |
| 2,509,811 | Dale | May 30, 1950 |
| 2,512,121 | Thevenaz | June 20, 1950 |
| 2,534,930 | Simmons | Dec. 19, 1950 |
| 2,546,136 | Ristau et al. | Mar. 20, 1951 |
| 2,550,794 | Fisher | May 1, 1951 |
| 2,555,594 | Markovitz | June 5, 1951 |
| 2,557,645 | Fox | June 19, 1951 |
| 2,622,884 | Carson | Dec. 23, 1952 |
| 2,643,127 | Gregg et al. | June 23, 1953 |

FOREIGN PATENTS

| | | |
|---|---|---|
| 377,173 | Great Britain | Jan. 16, 1931 |
| 582,654 | Germany | Aug. 3, 1933 |
| 822,026 | France | Dec. 18, 1937 |
| 477,325 | Great Britain | Dec. 24, 1937 |
| 541,156 | Great Britain | Nov. 14, 1941 |
| 554,553 | Great Britain | July 8, 1943 |